(12) United States Patent
Bacon

(10) Patent No.: US 10,081,397 B2
(45) Date of Patent: Sep. 25, 2018

(54) FUEL EFFICIENCY OF ROAD VEHICLES

(71) Applicant: Andy Bacon, Sandy (GB)

(72) Inventor: Andrew Bacon, Sandy (GB)

( * ) Notice: Subject to any disclaimer, the term of this patent is extended or adjusted under 35 U.S.C. 154(b) by 0 days.

(21) Appl. No.: 14/782,526

(22) PCT Filed: Apr. 7, 2014

(86) PCT No.: PCT/GB2014/051083
§ 371 (c)(1),
(2) Date: Oct. 5, 2015

(87) PCT Pub. No.: WO2014/162158
PCT Pub. Date: Oct. 9, 2014

(65) Prior Publication Data
US 2016/0052566 A1    Feb. 25, 2016

(30) Foreign Application Priority Data

Apr. 5, 2013  (GB) .................................. 1306219.5
Jul. 30, 2013  (GB) .................................. 1313553.8

(51) Int. Cl.
*B62D 35/00* (2006.01)
(52) U.S. Cl.
CPC .................................. *B62D 35/001* (2013.01)
(58) Field of Classification Search
CPC .................................................... B62D 35/001
USPC ..................................................... 296/180.4
See application file for complete search history.

(56) References Cited

U.S. PATENT DOCUMENTS

| | | | |
|---|---|---|---|
| 2,800,291 A | | 7/1957 | Stephens |
| 3,578,264 A | * | 5/1971 | Kuethe .................... B64C 21/10 181/220 |
| 4,343,506 A | | 8/1982 | Saltzman |
| 4,776,535 A | * | 10/1988 | Paterson ................ B62D 35/00 138/37 |
| 4,813,633 A | * | 3/1989 | Werle .................... B63H 9/0607 244/130 |
| 4,830,315 A | * | 5/1989 | Presz, Jr. ................ B64C 21/10 114/102.29 |
| 5,058,837 A | * | 10/1991 | Wheeler ................. B64C 23/06 244/198 |

(Continued)

FOREIGN PATENT DOCUMENTS

| | | |
|---|---|---|
| EP | 0654397 A1 | 5/1995 |
| EP | 2771231 A1 | 9/2014 |

(Continued)

OTHER PUBLICATIONS http://cdn.monolithic.org/vault/img/2011/05/10/4dc92b8ec29e068473000be7/large_tile07.jpg Sep. 27, 2017.*

(Continued)

*Primary Examiner* — Hilary L Gutman
(74) *Attorney, Agent, or Firm* — Osha Liang LLP

(57) ABSTRACT

A road haulage trailer (810) has tail deflectors (896) for directing air flow to a region (829) behind the trailer during forward movement of the trailer. The tail deflectors (896) protrude from the sides (822) of the trailer and extend beyond the rear end (825) of the trailer. The deflectors (896) define a guide surface that is angled or curved towards a region (829) behind the rear end (825) of the trailer (810) and is a continuation of the side (22) of the trailer.

17 Claims, 32 Drawing Sheets

(56) References Cited

U.S. PATENT DOCUMENTS

| | | | | |
|---|---|---|---|---|
| 5,114,099 | A | * | 5/1992 | Gao ................. B64C 21/10 244/130 |
| 5,522,637 | A | | 6/1996 | Spears |
| 5,833,389 | A | * | 11/1998 | Sirovich ............ B64C 21/10 138/39 |
| 6,959,958 | B2 | * | 11/2005 | Basford ............ B62D 35/001 296/180.1 |
| 7,100,969 | B2 | * | 9/2006 | Choi .................. B60J 1/20 180/903 |
| 7,192,077 | B1 | | 3/2007 | Hilleman |
| 7,900,871 | B2 | * | 3/2011 | Rincker ............ B64C 23/06 244/134 A |
| 8,757,701 | B2 | * | 6/2014 | Guigne ............ B62D 35/001 296/180.3 |
| 8,794,926 | B2 | * | 8/2014 | Routier ............ F01D 5/141 416/228 |
| 8,827,210 | B2 | * | 9/2014 | Schwetzler ....... B64C 7/02 244/199.1 |
| 8,870,124 | B2 | * | 10/2014 | Ireland ............ B64C 23/06 244/130 |
| 9,334,045 | B2 | * | 5/2016 | Wood ............... B64C 23/04 |
| 9,505,485 | B2 | * | 11/2016 | Dorsett ............ B64C 23/06 |
| 9,677,580 | B2 | * | 6/2017 | Barrett ............ F15D 1/004 |
| 9,682,735 | B2 | * | 6/2017 | Bacon ............ B62D 35/001 |
| 2007/0235590 | A1 | | 10/2007 | Kokoshkin et al. |
| 2007/0246969 | A1 | | 10/2007 | Smith et al. |
| 2011/0175395 | A1 | | 7/2011 | Guigne et al. |
| 2011/0272964 | A1 | | 11/2011 | Henderson et al. |
| 2012/0292945 | A1 | | 11/2012 | Nusbaum |
| 2013/0076063 | A1 | | 3/2013 | Ryan et al. |
| 2013/0076064 | A1 | | 3/2013 | Smith et al. |

FOREIGN PATENT DOCUMENTS

| | | |
|---|---|---|
| GB | 2443035 A | 4/2008 |
| GB | 2511871 A | 9/2014 |
| JP | 2000033886 A | 2/2000 |
| NZ | 565720 A | 10/2010 |
| WO | 9009303 A1 | 8/1990 |
| WO | 2013063479 A1 | 5/2013 |
| WO | 2014035299 A1 | 3/2014 |

OTHER PUBLICATIONS http://aerospaceengineeringblog.com/boundary-layer-separation-and-pressure-drag/ (Year: 2016).*
https://history.nasa.gov/SP-367/chapt3.htm (Year: 2005).*
International Search Report issued in PCT/GB2014/051083 dated Oct. 9, 2014 (5 pages).
Written Opinion of the International Searching Authority issued in PCT/GB2014/051083 dated Oct. 9, 2014 (9 pages).

* cited by examiner

FUEL EFFICIENCY OF ROAD VEHICLES

FIELD OF THE INVENTION

The present invention relates to road vehicles, more particularly, but not exclusively, to road haulage vehicles, further particularly, but not exclusively, articulated road haulage vehicles, having a structure configured for improving fuel efficiency.

BACKGROUND OF THE INVENTION

It is known that improvements in vehicle performance and fuel consumption can be achieved through improvements in the aerodynamic structure of a vehicle. Such improvements are sought in the design of vehicles in the haulage industry, for example articulated vehicles of the kind having a cab and trailer.

GB2443035 describes a road haulage vehicle (with cab and trailer) having a curved roof profile which purports to improve the aerodynamic efficiency of the trailer. However, such systems have been found to be optimal when used with rigid vehicles because there can be large aerodynamic inefficiencies when used with articulated trailers.

Generally tractors usually have adjustable height fairings, the fairing cannot operate optimally at all positions of the fairing. Indeed, in some fairing positions there is a large reduction in aerodynamic efficiency.

SUMMARY OF THE INVENTION

The present invention seeks to improve the aerodynamic performance of road haulage vehicles and/or trailers for road haulage vehicles.

According to a first aspect the present invention provides a road haulage trailer having: a roof, an underside, a front end, a rear end and two sides extending between the front end and the rear end; and an air flow guide having a first portion protruding from the roof of the trailer and a second portion overhanging the roof of the trailer at the front end of the trailer;

wherein the air flow guide includes a surface having a front portion and a rear portion. The front portion, preferably being curved or inclined, increases in height towards the rear of the trailer so that the air flow guide increases in height towards the rear of the trailer. The rear portion, preferably being curved or inclined, decreases in height towards the rear of the trailer, so that the air flow guide decreases in height towards the rear of the trailer.

The height of the air flow guide is measured upwardly from a plane defined by the roof.

The air flow guide may be configured to have maximum height at or near the front end of the trailer (e.g. in a plane coincident with a front face of trailer).

The front and/or rear portion of the air flow guide may include curved side walls that curve inwardly from a position adjacent the sides of the trailer towards a central region. The curved side walls may have a radius substantially equal to a height of protrusion of the air flow guide from the roof of the trailer. This configuration of air flow guide has been found to further improve aerodynamic performance in yaw.

The haulage trailer may be of the kind connectable to a cab or tractor unit by a fifth wheel coupling. The two sides of the trailer may be rigid or curtain sided, single or multi deck.

The second portion of the air flow guide may extend substantially downwardly from the plane of the roof. For example, the air flow guide may include a front section that extends downwardly from the roof and protrudes forwards from a front face of the trailer.

The second portion of the air flow guide may protrude further in a region distal to the plane of the roof than in a region proximal to the plane of the roof, and/or may be curved or inclined.

The second portion may include two side surfaces, one at each side of the trailer. The two side surfaces may be angled or curved. Preferably, the side surfaces are angled or curved from the respective side of the trailer towards a substantially central region of the front end of the trailer.

The two side surfaces may extend substantially from a plane defined by the underside of the trailer substantially to the plane of the roof of the trailer.

The surface (e.g. the upper surface) of the air flow guide may include a convex curve. The convex curve may have a portion of at least two different radii. The radius of curvature of the convex curve may increase from a front end towards a rear end of the surface.

An end of the surface (e.g. the upper surface) of the air flow guide towards a rear of the trailer may be inclined.

The second portion of the air flow guide may in a first region proximal the plane of the roof protrude further in a region distal the plane of the roof than in a region proximal to the plane of the roof, and/or may be curved or inclined. The second portion may in a second region distal the plane of the roof protrude further in a region proximal the plane of the roof than in a region proximal the plane of the roof, and/or may be curved or inclined. For example, the trailer may define a container having a front face, a roof, a rear face, an underside and two sides extending between the front face and the rear face. The second portion may protrude from the front face by a varying extent. In a direction from an upper surface of the air flow guide to the underside of the container, a distance of protrusion of the second portion from the front face may increase and then decrease, e.g. following a convex curved profile near an upper end of the trailer.

The trailer unit may be configured for articulated coupling to the tractor unit.

The air guide may be formed as a separate component connectable, e.g. using bolts, to the roof and/or a front face of the trailer.

A second aspect of the invention provides an aerodynamic unit connectable to a haulage trailer, the aerodynamic unit comprising: an air flow guide having a first portion configured to be seated on a roof of a trailer and a second portion overhanging the roof of the trailer at the front end of the trailer; wherein the air flow guide includes an upper surface having a front portion and a rear portion. The front portion, preferably being curved or inclined, increases in height towards the rear of the trailer, so that the air flow guide increases in height towards the rear of the trailer, and the rear portion, preferably being curved or inclined, decreases in height towards the rear of the trailer, so that the air flow guide decreases in height towards the rear of the trailer.

The air flow guide of the second aspect may have one or more of the optional features of the air flow guide of the trailer of the first aspect.

A third aspect of the invention may provide a road haulage trailer having a front end and a rear end, the trailer comprising: a roof, an underside, a front face, a rear face and two sides extending between the front face and the rear face; and two side members positioned on the front face and protruding therefrom, one side member being adjacent one of the two sides of the trailer and the other side member being adjacent the other one of the two sides of the trailer. Preferably, the two side members extend substantially vertically.

Each side member may include a surface that is angled or curved from the respective side of the trailer towards a region substantially central to the front face. Providing angled or curved side members improves aerodynamic efficiency, whilst maintaining maximum capacity of the trailer (because square corners of the trailer are maintained), and keeping the dimensions of the trailer within European legal requirements.

The trailer of the third aspect of the invention may have one or more features of the trailer of the first aspect.

According to a fourth aspect of the invention, there is provided a road haulage trailer defining two sides and a roof, wherein the trailer has a front end which includes a pair of substantially vertically arranged ribs (e.g. spaced apart, one on either side of a front face of the trailer) projecting forwardly from the trailer, each defining a transition (e.g. of curved profile) with a respective side of the trailer along at least a significant proportion of a respective vertical edge at the front end of the trailer, for reducing the gap between the trailer and the cab of the tractor unit, whilst permitting articulation of the cab relative to the trailer.

The ribs may be formed from steel section.

The trailer of the fourth aspect of the invention may have one or more features of the trailer of the first and/or third aspects.

According to a fifth aspect of the invention, there is provided a road haulage trailer defining two sides and a roof, wherein the trailer has an air guide fitted to or extending from the roof at a front end of the trailer, so as to increase the overall height of the trailer at the front end, and wherein the air guide projects forwardly from the front end of the trailer unit with a convex curvature. The air guide reduces the gap between the fairing of a tractor unit and the trailer unit, whilst permitting fifth wheel articulation of the tractor unit relative to the trailer.

A maximum forward extension of the air guide may occur in alignment with the centre of the air guide in plan view.

The trailer of the fifth aspect of the invention may have one or more features of the trailer of the first, third and/or fourth aspects.

According to a sixth aspect the invention provides a road haulage trailer having: a roof, an underside, a front end, a rear end and two sides extending between the front end and the rear end; an axle connected to the underside of the trailer and coupled to two wheels, one at each end of the axle; and an air flow deflector extending from the underside of the trailer, and wherein the air flow director is positioned on a side of the axle proximal the front end. Preferably, the air flow deflector extends downwardly beyond the axle.

The road haulage trailer may have one, two, or three or more axles.

The air flow deflector may be curved in a region distal to a plane of the underside of the trailer. The air flow deflector may be curved in a direction towards the rear end of the trailer.

The deflector may be positioned substantially midway between the two sides of the trailer. The deflector may extend approximately one quarter to three quarters of a distance between the two sides, for example less than, more than or equal to one half or one third of a distance between the two sides.

The road haulage trailer may comprise a wheel member positioned on a side of a wheel proximal the front end. The wheel member may extend downwardly from the underside of the trailer beyond the axle.

The wheel member may have a width equal to or greater than the width of the wheel.

The road haulage trailer may comprise a rear guide member. The rear guide member may extend from the underside of the trailer on a side of the axle proximal the rear end of the trailer. The rear guide member may decrease in height in a direction towards the rear end of the trailer. For example, the rear guide member may be substantially wedge shaped. Preferably, the rear guide member has a surface that is curved or angled so that the rear guide member decreases in height.

The rear guide member may include, on a side proximal the front end of the trailer, a face that is substantially planar and extends from the underside of the trailer.

A transition between the planar surface and the curved or angled surface may be rounded. For example, the transition may have a large radius, e.g. a radius greater than or equal to 100 mm.

The trailer may comprise two axles and a panel fixed to the axles so as to extend therebetween, preferably extending below the axles.

The trailer may comprise three axles and a panel fixed to the axles so as to extend therebetween, preferably extending below the axles. For example, the panel may be provided in two parts, and the first part may extend between two axles and a second part may extend between two axles. Alternatively, a single panel may be fitted to all three axles.

The panel may include slots, e.g. of elongate shape. The road haulage trailer may be bolted to the axle via the slots. The slots may extend for example, in a rearward-forward (i.e. substantially horizontal) direction and/or in a direction parallel to a direction from one side of the trailer to the other side of the trailer. The slots may provide a hinge to account for relative movement between the axles.

The panel may be made from a plastics material. The panel may be reinforced, in particular in regions where substantial flexing is not required.

The trailer of the sixth aspect of the invention may have one or more features of the trailer of the first, third, fourth and/or fifth aspects.

According to a seventh aspect the invention provides a road haulage trailer having: a roof, an underside, a front end, a rear end and two sides extending between the front end and the rear end; an axle connected to the underside of the trailer and coupled to two wheels, one at each end of the axle; and a wheel member positioned on a side of the wheel proximal to the front end. The wheel member may extend downwardly from the underside of the trailer beyond the axle.

The trailer of the seventh aspect of the invention may have one or more features of the trailer of the first, third, fourth, fifth, and/or sixth aspects.

According to an eighth aspect the invention provides a road haulage trailer having: a roof, an underside, a front end, a rear end and two sides extending between the front end and the rear end; an axle connected to the underside of the trailer and coupled to two wheels, one at each end of the axle; and a rear guide member. The rear guide member may extend from the underside of the trailer on a side of the axle proximal the rear end of the trailer. The rear guide member may have a surface that is curved or angled so that the rear guide member decreases in height in a direction towards the rear end of the trailer, for example, the rear guide member may be wedge shaped.

The trailer of the eighth aspect of the invention may have one or more features of the trailer of the first, third, fourth, fifth, sixth and/or seventh aspects.

According to a ninth aspect of the invention there is provided a road haulage trailer having: a roof, an underside, a front end, a rear end and two sides extending between the front end and the rear end; two axles connected to the underside of the trailer and each coupled to two wheels, one at each end of the respective axle; and a panel fixed to the axles so as to extend therebetween, preferably extending below the axles.

The trailer of the ninth aspect of the invention may have one or more features of the trailer of the first, third, fourth, fifth, sixth, seventh and/or eighth aspects.

According to a tenth aspect of the invention, there is provided a road haulage trailer defining two sides and a roof, wherein the trailer further includes a pair of longitudinal fins projecting from the roof of the trailer unit, each fin having an external surface which provides at least a generally continuous transition with a respective side of the trailer.

The fins may define a large radius corner along a significant proportion of a respective horizontal edge of the trailer unit. The height and/or radius of the fins may taper down to the rear of the trailer.

One or more vortex generators may project from the roof at the rear end of the trailer in a region delimited on either side by the fins.

The vortex generators may be formed as a duct having at an inlet a neck that leads to a wider region at an outlet, e.g. the duct is wishbone shaped. A base of the duct may slope downwardly from the neck towards the wider region.

Such a construction of vortex generator has been found to be particularly advantageous in improving the aerodynamic efficiency of a road haulage trailer. It is believed that the shape of the duct and the downward slope of the duct creates vortices of air that deflect the boundary layer and permit faster moving air to be drawn into the duct and be directed to the rear of the vehicle. In addition to this, the slope provides improved direction to air flow permitting air flow to more effectively be directed to a region behind a rear face of the trailer unit to further improve aerodynamic efficiency. This construction of vortex generator has been found to be much more advantageous in improving the aerodynamic efficiency of a trailer than other known vortex generators which generally create a physical barrier to airflow over the trailer which splits the air flow to create two vortices.

The trailer of the tenth aspect of the invention may have one or more features of the trailer of the first, third, fourth, fifth, sixth, seventh, eighth and/or ninth aspects.

According to an eleventh aspect of the invention there is provided a road haulage trailer having: a container for goods defined by a roof, an underside, a front face, a rear face, and two side faces extending between the front and rear faces; and two tail deflectors for, in use, directing air flow to a region behind the rear face of the trailer.

Preferably, the tail deflectors protrude outwardly from the two side faces in a lateral direction and extend rearwardly beyond a rear of the container. Preferably, each tail deflector defines a surface that is angled or curved towards the region behind the rear face of the trailer.

Directing air flow to a region behind the trailer (i.e. using the tail deflectors) improves the aerodynamic efficiency of the trailer. The present inventor has found that arranging the tail deflectors to protrude radially outwardly from the two side faces in a lateral direction further improves aerodynamic efficiency. This is thought to be because the air flow has a thick boundary layer towards the rear of the trailer and providing a tail deflector that protrudes laterally from the side of the trailer provides a head in through the boundary layer to better deflect the air flow.

A forward-most portion of the tail deflector may be angled or curved so as to protrude laterally by an increasing distance from the side face in a rearward direction, e.g. so as to provide a tapered head in through a boundary layer of air flowing alongside the trailer.

The forward-most portion of the tail deflector may define a convex curved surface. Such a convex curve has been found to further improve the aerodynamic performance of the tail deflector.

A plurality of vortex generators may be provided on the two tail deflectors. The vortex generators each create vortices that maintain a flow of air off the rear end of the tail deflectors in substantial alignment with an inclined or curved surface of the tail deflectors, which contributes to improving the efficiency of the trailer.

Each vortex generator may define a duct having a neck towards a forward-most end of the tail deflectors and a wider region towards a rearward-most end of the tail deflectors (e.g. the vortex generator may be wishbone shaped). Provision of a duct with a wishbone shape has been found to be particularly advantageous in directing air to a region behind the rear face of the trailer, for similar reasons as those explained for the previously described vortex generators. Each duct may have a base that slopes towards the region behind the rear face of the trailer.

The duct may be defined by a wall that protrudes from the tail deflector so as to define a lateral face that extends substantially parallel to the respective side face of the container. Alternatively, the duct may be defined by a wall that protrudes from the tail deflector by a varying extent so as to define a lateral face that is angled inwardly to a region behind the rear face of the trailer. Angling of the lateral face of the wall has been found to further improve aerodynamic efficiency.

The two tail deflectors may protrude outwardly from the two lateral sides by a distance greater than or equal to 30 mm, for example about 50 mm.

The tail deflectors may extend beyond the rear of the trailer by approximately 500 mm. It has been found that in some embodiments the protrusion of the tail deflectors from the sides of the trailer can result in 500 mm tail deflectors performing approximately the same or better in terms of energy efficiency as 1000 mm tail deflectors without a lateral protrusion and/or vortex generators.

According to a twelfth aspect the invention provides a road haulage trailer having: a container for goods defined by a roof, an underside, a front face, a rear face, and two side faces extending between the front and rear faces; two tail deflectors for, in use, directing air flow to a region behind the trailer, wherein the tail deflectors extend rearwardly beyond a rear of the container, and wherein each tail deflector defines a surface that is angled or curved towards the region behind the trailer; and a plurality of vortex generators provided on the two tail deflectors.

The road haulage vehicle of the twelfth aspect may have one or more features of the road haulage vehicle of the eleventh aspect.

According to a thirteenth aspect, the invention provides a road haulage trailer comprising: a roof, an underside, a front end, a rear end and two sides extending between the front end and the rear end; an axle connected to the underside of the trailer and coupled to two wheels, one at each end of the axle; and a rear guide member, wherein the rear guide member extends from the underside of the trailer on a side of the axle proximal the rear end of the trailer and has a surface that is curved or angled so that the rear guide member decreases in height in a direction towards the rear end of the trailer (e.g. the rear guide member is wedge shaped).

The rear guide member has been found to further improve aerodynamic efficiency of the road haulage trailer.

A plurality of vortex generators may be provided on the rear guide member. The vortex generators yet further improve the aerodynamic efficiency of the road haulage trailer. Each vortex generator may define a duct having a neck towards a forward-most end of the rear guide member and a wider region towards a rearward-most end of the rear guide member (e.g. wishbone shaped).

The road haulage trailer may comprise two vertical fins; one fin extending along each lateral side of the rear guide member.

The road haulage trailer may comprise two curved fins positioned to define a throat that directs air flow to the rear guide member.

The rear guide member may include, on a side proximal the front end of the trailer, a planar surface that extends from the underside of the trailer in a substantially vertical plane.

The transition between the planar surface and the curved or angled surface may be rounded, e.g. having a large radius.

The road haulage trailer may comprise a wheel deflector positioned on a side of a wheel proximal the front end, wherein the wheel deflector extends downwardly from the underside of the trailer beyond the axle. The wheel deflector may have a width equal to or greater than the width of the wheel.

The road haulage trailer may comprise an air flow deflector extending from the underside of the trailer, wherein the air flow deflector may be positioned on a side of the axle proximal the front end, and the air flow deflector may extend downwardly beyond the axle.

The air flow deflector may be curved in a region distal the underside of the trailer, and may be curved in a direction towards the rear end of the trailer.

The air flow deflector may be positioned substantially midway between the two sides of the trailer. The air flow deflector may extend approximately one quarter to three quarters of a distance between the two sides, for example less than, more than or equal to one half or one third of a distance between the two sides.

According to a fourteenth aspect the invention provides a road haulage trailer comprising: a roof, an underside, a front end, a rear end and two sides extending between the front end and the rear end; an axle connected to the underside of the trailer and coupled to two wheels, one at each end of the axle; and a wheel deflector positioned on a side of a wheel proximal the front end, wherein the wheel deflector extends downwardly from the underside of the trailer beyond the axle.

According to a fifteenth aspect the invention provides a road haulage vehicle comprising: a tractor unit connected to a trailer unit; the tractor unit comprising a cab having a roof fairing and a side fairing, and a plurality of vortex generators provided along the side fairing, wherein each vortex generator defines a duct having a neck at an inlet and a wider region at an outlet. Preferably, a base of the duct is angled inwardly towards a side face of the trailer unit.

Each vortex generator may extend in a forward-rearward direction by a distance greater than half the length of the side fairing in the forward-rearward direction. The vortex generators may extend in a forward-rearward direction by a distance greater than ⅔ of the length of the side fairing in the forward-rearward direction (for example equal to or greater than ¾ of the length of the side fairing in the forward-rearward direction).

The vortex generators may protrude from the fairing by approx. 20 to 40 mm.

The road haulage vehicle may comprise a plurality of vortex generators provided along the roof fairing. Each vortex generator may define a duct having a neck at an inlet and a wider region at an outlet. A base of the duct may be angled inwardly towards the trailer unit.

The vortex generators may be integrally formed with the side fairing.

According to a sixteenth aspect of the invention there is provided a road haulage vehicle having a front end and a rear end, the vehicle comprising: a cab; and an air dam on an underside of the cab, wherein the air dam is offset from a front of the cab.

Offsetting the air dam from the front of the cab has been found to improve the performance of the air dam, which results in improved aerodynamic efficiency of the road vehicle. A further advantageous consequence is that the air dam can be made to extend by a lesser distance from the underside of the cab with reduced impact on aerodynamic efficiency compared to air dams of the prior art. The reduced protrusion from the underside of the vehicle and the offset of the air dam from the front of the cab reduces the risk of the air dam impacting an obstacle such as a curb which could damage the air dam.

The air dam may be V-shaped in the forward-rearward direction such that the air dam has a first arm angled towards a left hand side and the rear of the vehicle, and a second arm angled towards a right hand side and the rear of the vehicle. The V-shaped construction of the air dam permits the air dam to be spaced further back from the front of the cab than, for example a rounded shape. The V-shaped construction has further been found to improve the direction of air flow compared to a conventional round shaped air dam.

It is well known that the lower the air dam the greater aerodynamic efficiency but of course the propensity to damage increases as well. This damage normally occurs at low speed maneuvering. This shape of the air dam readily avails itself to being lowered at the rear for improved efficiency at higher speeds.

The air dam may protrude from an underside of the vehicle by a distance of about 20 to 100 mm.

The air dam may include a V-shaped channel extending along a front of the air dam.

Each arm may have an end portion that extends from each of the first and second arms in a rearward direction.

According to a seventeenth aspect of the invention there is provided a road haulage vehicle having a front end and a rear end, the vehicle comprising: a cab; and an air dam on an underside of the cab, wherein the air dam is V-shaped in a forward-rearward direction.

According to an eighteenth aspect of the invention there is provided a road haulage vehicle (e.g. a rigid vehicle or an articulated vehicle) comprising: a tractor unit and a trailer unit, the tractor unit comprising a cab having a windscreen and an A-pillar support on both lateral sides of a windscreen; and an A-pillar deflector positioned on each of the A-pillar supports for directing airflow along the sides of the tractor unit.

The A-pillar deflectors may extend in excess of the full height of the windscreen.

Each A-pillar deflector may have a curved profile that curves outwardly from a position adjacent the lateral sides of the windscreen towards a rear of the vehicle.

The A-pillar deflectors may each define a convex curved surface that has a radius that increases from a minimum at forward-most end to a maximum at a rearward-most end.

Each A-pillar deflector may have an intake area adjacent the windscreen and an exit area spaced from and rearward of the windscreen. The intake area may be greater in size than the exit area due to a reduction in height or width or both, e.g. the reduction in height or width may be in the order of 10 to 20%.

In a nineteenth aspect of the invention there is provided a road haulage trailer comprising: a container having a front face, a rear face, an underside, a roof and two sides extending between the front face and the rear face; a side skirt protruding downwardly from the two sides of the container, wherein the side skirt includes a rib (e.g. a splitter) protruding outwardly from the side skirt.

The rib splits air flow transverse to the direction of travel of the trailer so as to reduce the volume of airflow underneath the trailer, which has been found to improve aerodynamic efficiency.

The rib may have a thickness (i.e. a height in the vertical direction) of at least 6 mm (e.g. 20 mm).

The corners of the rib may be rounded (e.g. greater than or equal to 3 mm radius).

A forward-most end of the side skirt may be curved inwardly and may extend to a position underneath the underside of the container.

The forward-most end of the side skirt may be planar (i.e. the forward-most end of the side skirt may not include a rib).

The road haulage trailer may comprise curtains along two sides of the trailer connected to hooks, and a recess along a lower portion of each of the two sides for accommodating the hooks, and wherein the side skirt comprises a further splitter for limiting air flow to the recess.

The side skirt may be made from a material such that the side skirt does not substantially flex if an obstacle is impacted by the side skirt. Alternatively, the side skirt may be at least partially made from a material such that the side skirt flexes to be displaced if an obstacle is impacted.

BRIEF DESCRIPTION OF THE DRAWINGS

Other aspects and preferred features of the invention will be apparent from the following description of preferred embodiments, made by way of example only, with respect to the accompanying drawings, in which.

DETAILED DESCRIPTION OF EMBODIMENT(S)

Figure 1:
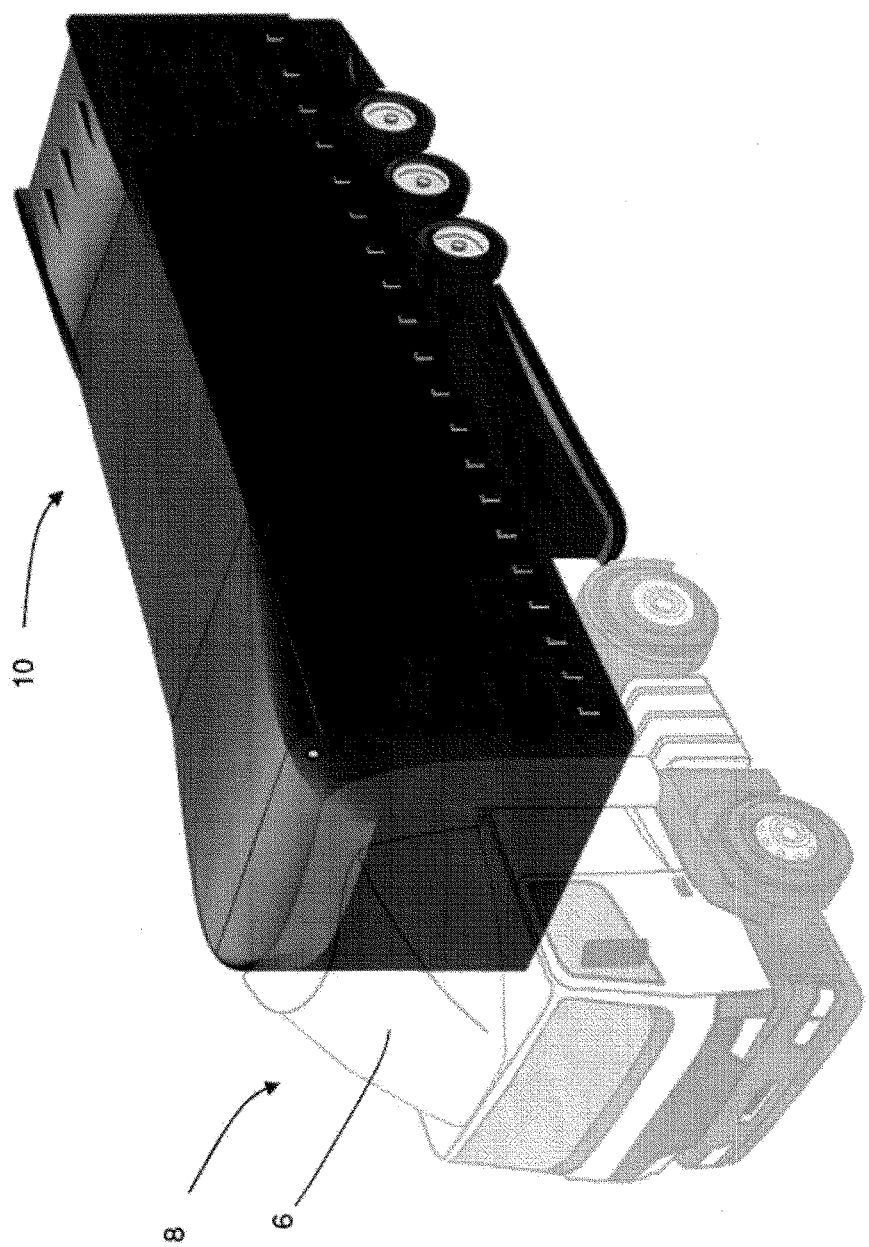
FIG. 1 shows a perspective view of an articulated haulage vehicle having a trailer and a tractor unit.
Figure 2:
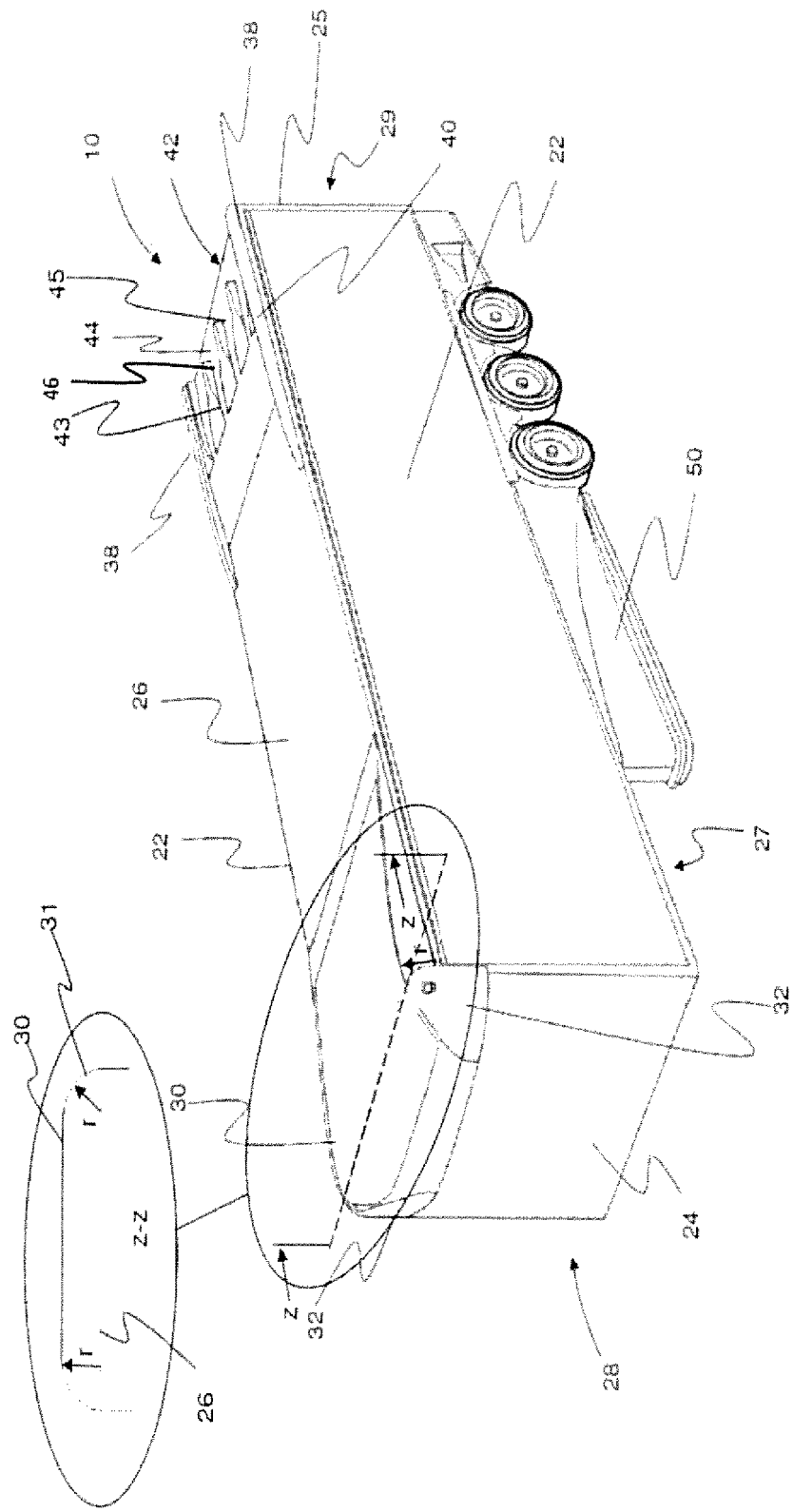
FIG. 2 shows a perspective view of the trailer of FIG. 1 isolated from the tractor unit.

Referring firstly to FIGS. 1 and 2, a trailer unit is indicated generally at 10. In the present embodiment, the trailer unit 10 is intended for articulated connection to a wheeled tractor unit 8 having a cab. The articulated connection is such that the trailer can articulate relative to the tractor unit 8 and is provided by a conventional fifth wheel and king pin coupling (not shown). The cab includes an aerodynamic fairing 6 configured for directing air flow from a front of a trailer towards a rear of a trailer.

The trailer unit 10 may be formed at the point of manufacture, or the trailer unit 10 may be formed by modifying a conventional trailer unit. The trailer unit 10 defines a container having a roof 26, an underside which is connected to wheels to form an underside of a trailer 27, a front face 24, a rear face 25 and two sides 22 extending between the front face and rear face. The corners between the roof, front face, sides, rear face and underside are all substantially squared corners.

The trailer unit 10 has a front end 28 that includes an air flow guide 30, intended to improve the aerodynamic performance of the trailer unit 10.

The air flow guide 30 includes a portion seated on the roof 26 of the trailer, and a portion that overhangs the roof of the trailer towards a front end of the trailer. The portion of the air flow guide 30 that overhangs the roof of the trailer extends downwardly to a position spaced from the roof of the trailer unit 10. The portion of the air flow guide 30 that overhangs the roof 26 extends downwardly towards the underside 27 along the front face of the container.

The air flow guide 30 has an upper surface that is curved from the front 28 of the trailer towards the rear 29 of the trailer. The curve is such that, from front to rear, the height of the trailer increases and then decreases.

An end of the air flow guide 30 proximal to the rear of the trailer is inclined to provide a smooth transition to the roof 26 of the trailer. The curved portion of the air flow guide 30 is convex and is formed of curves having increasing radius from the front of the trailer towards the rear of the trailer.

The portion of the air flow guide that overhangs the roof has curved sides 32. The curve of the sides 32 is convex and provides a smooth transition from the sides 22 of the trailer to the front 28 of the trailer, in the region of the air flow guide.

The portion of the air flow guide 30 that overhangs the roof and the portion that is proximal to the rear includes sides 31 that define a convex curve having a radius r, which is substantially equal to the height of the protrusion of the air flow guide from the roof. The sides 31 curve inwardly from a plane coincident with the sides 22 of the trailer. This construction has been found to improve aerodynamic performance in yaw.

The shape and provision of the air flow guide means that air flow is efficiently directed over the roof of the trailer even when the fairing is adjusted to levels that are above or below an optimal height. As can be seen in FIG. 2, the maximum height of the air flow guide is substantially aligned with the front face 24 of the trailer 10, which has been found to further improve the aerodynamic performance of a road haulage vehicle.

Increasing the height of the trailer would generally be expected in the art to decrease aerodynamic efficiency. However, it has been found that the improvements in aerodynamic efficiency provided by the air flow guide 30 are extensive enough to negate any disadvantages associated with the increased height of the trailer.

Furthermore, the projection of the air flow guide from the front of the trailer and the curved sides 32 means that the trailer can be effectively used with an articulated coupling to a tractor unit. A problem with trailers of the prior art is that, when connected by an articulated coupling to a tractor unit, the trailers often have acceptable aerodynamic efficiency when the air flow is exactly aligned with the direction of travel, but due to side winds this is rarely the case. The curved sides and coupling reduce the amount of air that can be trapped between the trailer and tractor when encountering any side winds, and therefore improves the aerodynamic efficiency of the vehicle.

Figure 3:
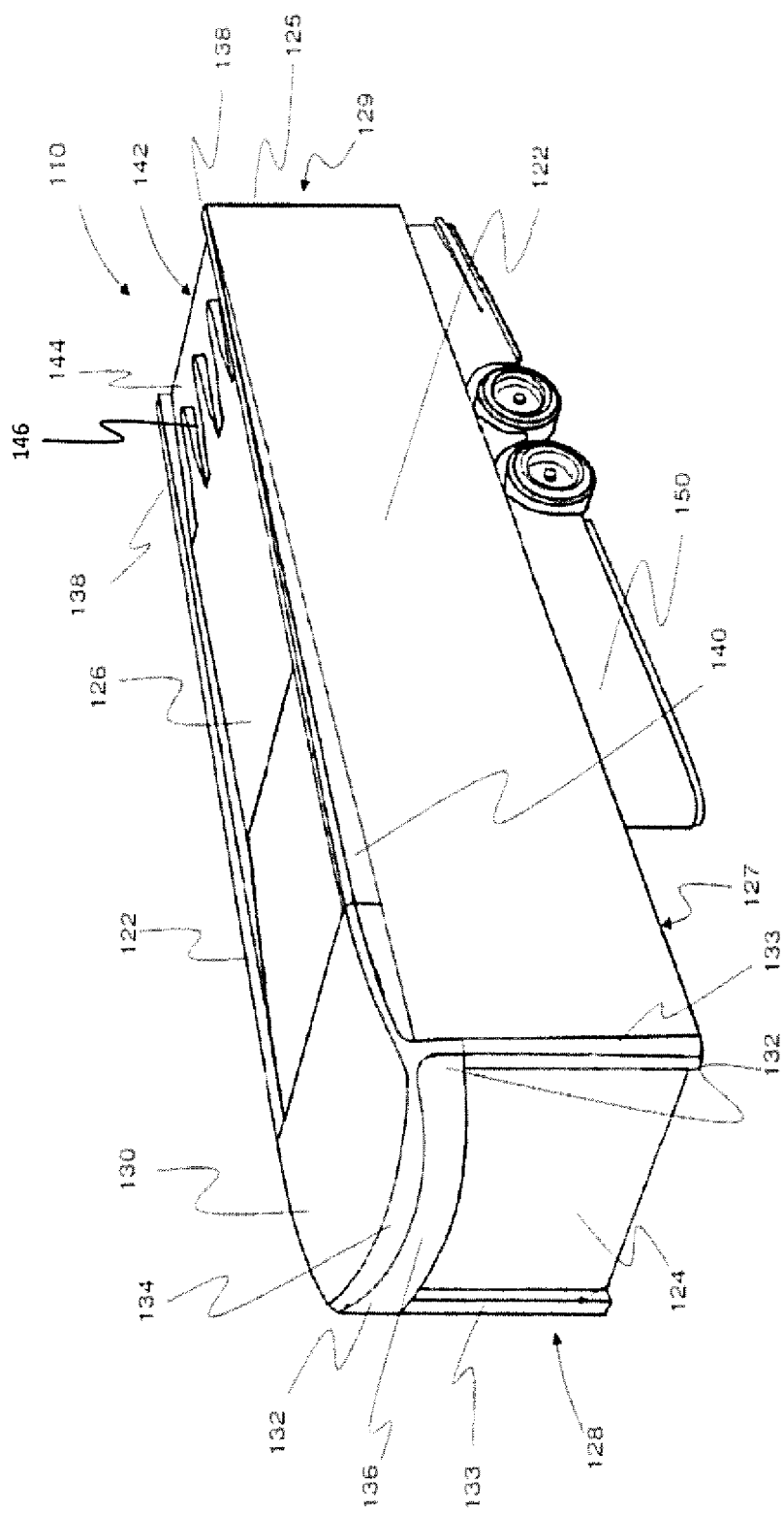
FIG. 3 shows a perspective view of an alternative trailer.

An alternative trailer is indicated generally at 110 in FIG. 3. The trailer 110 has an air guide 130 similar to the air guide 30 of FIG. 2. Similar features are given similar reference numerals but with a prefix "1", and only the differences will be described.

The portion of the air guide 130 that overhangs the trailer is curved in an upper region 134 but has a flat front face 136. The two sides 132 of the portion that overhangs the roof 126 are curved to an extent that the two curved sides meet in the central region, such that the portion that overhangs has a profile of a circular segment.

Two side members 133 protrude from the front face 124 of the trailer 110. One side member extends along each of the two vertical edges of the front face, from the underside to the air guide 130.

Figure 4:
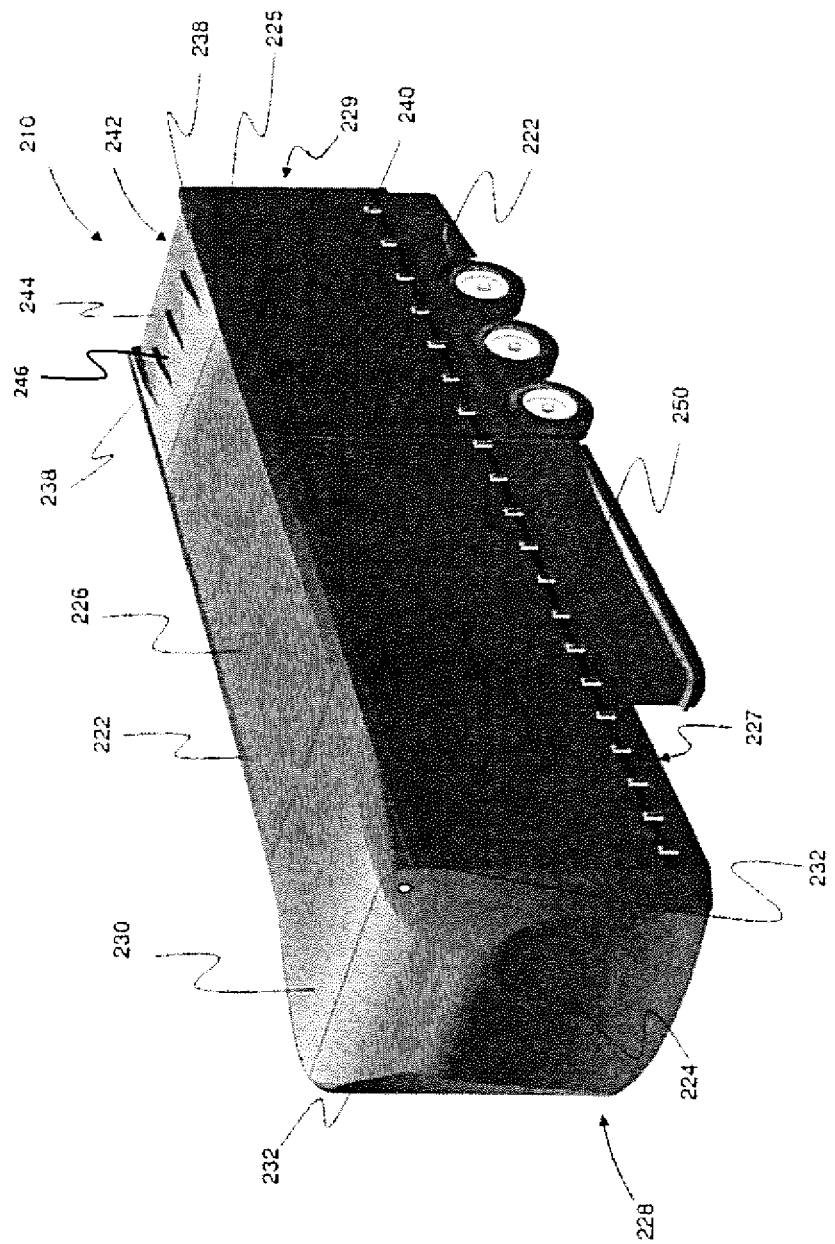
FIG. 4 shows a perspective view of a further alternative trailer.

A yet further alternative trailer 210 is shown in FIG. 4. The trailer 210 has an air guide 230 similar to the air guide 30 of FIG. 3. Similar features are given similar reference numerals but with a prefix "2", and only the differences will be described.

The guide 230 has a similar construction the guide 30 of FIG. 2, except that the portion of the air flow guide that overhangs the roof of the vehicle extends the full length and width of the front face. The sides 232 of the overhanging portion of the air flow guide are convexly curved from the sides 222 towards a central region of the front end 228 of the trailer, and the sides 222 extend the full height of the front face.

Considering the overhanging portion of the air flow guide in a direction from the roof to the underside of the trailer, the air flow guide curves forwardly, so as protrude more from the front face of the trailer towards the underside of the trailer. The air flow guide then curves rearwardly so as to protrude less from the front face of the trailer in a direction towards the underside of the trailer. Finally, air flow guide has a substantially flat section that extends downwardly to the underside of the trailer.

Considering the trailers 110, 210, shown in FIGS. 3 and 4, a pair of longitudinal sections 138, 238 extend as a fin projecting from the roof 124, 224 of the trailer unit 110, 210. Each fin 138, 238 has an external surface 140, 240 providing at least a generally continuous transition with a respective side 122, 222 of the trailer unit 110, 220. In presently described embodiments, the external surface 140, 240 is planar, but in alternative embodiments the external surface may be a convex curve. In the embodiment shown in FIG. 3, the height of the fins 138 tapers down to the rear of the trailer unit 110. However, alternatively, as in the embodiment shown in FIG. 4, the height of the fins 238 remains substantially constant from a position adjacent the air flow guide 230 to a the rear of the trailer unit 210.

In the embodiment shown in FIG. 2, fins 38 are provided, but the fins are only positioned in a region towards the rear of the trailer.

Referring to FIGS. 2 to 4, a vortex panel 42, 142, 242 is mounted on the roof 24, 124, 224 at the rear end of the trailer unit 10, 110, 210. The panel 42 defines a sloping surface 44, 144, 244 from which a plurality of tapered, wishbone shaped vortex generators 46, 146, 246 extend. The sloping surface 44, 144, 244 is arranged to slope down to the rear end of the trailer unit 10, 110, 210.

The vortex generators are formed as a duct having at an inlet a neck 43 that leads to a wider region 45 at an outlet, e.g. the duct is wishbone shaped (the neck an wider region are only labelled in FIG. 2 but a neck and outlet region are present in FIGS. 3 and 4 also). A base of the duct slopes downwardly from the neck towards the wider region. In the present embodiment, the walls that define the duct have an upper surface that is substantially horizontal. However, in alternative embodiments the walls may taper towards the outlet so as to have an upper surface that is angled downwardly towards the outlet. In such embodiments the angle of the base will generally be greater than the angle of the upper surface of the wall so that the walls protrude from the base of the vortex generator by a greater extent at the outlet than at the inlet.

Such a construction of vortex generator has been found to be particularly advantageous in improving the aerodynamic efficiency of the road haulage trailer.

The panel 42, 142, 242 is intended to direct air flow so as to be aligned with the surface 44 as air flows over at least part of the surface 44, 144, 244, and as air exits the rear 29, 129, 229 of the trailer 10, 110, 210.

The height of the panel 42, 142, 242 is less than the height of the longitudinal fins 38, 138, 238 on the roof 24, 124, 224, i.e. the upper surface of each vortex generator 46, 146, 246 is below the height of the fins 38, 138, 238. However, in alternative embodiments the height of the vortex generators may be equal to the height of the fins.

The panel 42, 242 of the embodiments shown in FIGS. 2 and 4 further includes a portion towards the front of the trailer that is curved to increase in height from the roof of the trailer to a position of maximum height of the surface 44, 244.

The panels 442, 242 of the trailers of FIGS. 2 and 4 are formed separately to the roof of the trailer, and are connected to the roof of the trailer, for example using bolts. The panel 142 of FIG. 2 is formed integrally with the roof of the trailer, but in alternative embodiments may be formed separately.

The trailers 10, 110, 210 shown in FIGS. 2 to 4, include a side skirt 50, 150, 250 (shown on one side only, for illustrative purposes), which is in effect, a continuation of the side 22, 122, 222 of the trailer 10, and extends downwardly in the direction of the road surface on which the trailer 10, 110, 210 is intended to travel.

The air guide 30, 130, 230, skirt 50, 150, 250, fins 38, 138, 238, and the side members 133 may at least in part be formed integrally with the trailer unit, but it is intended that said components be formed separately and connected to a relevant position on the sides, roof or front face, for example using bolts. This is particularly applicable to the curved sides of the air guide 30, 130, 230 because it is currently difficult to manufacture such a structure integrally with a trailer container.

Figure 5:
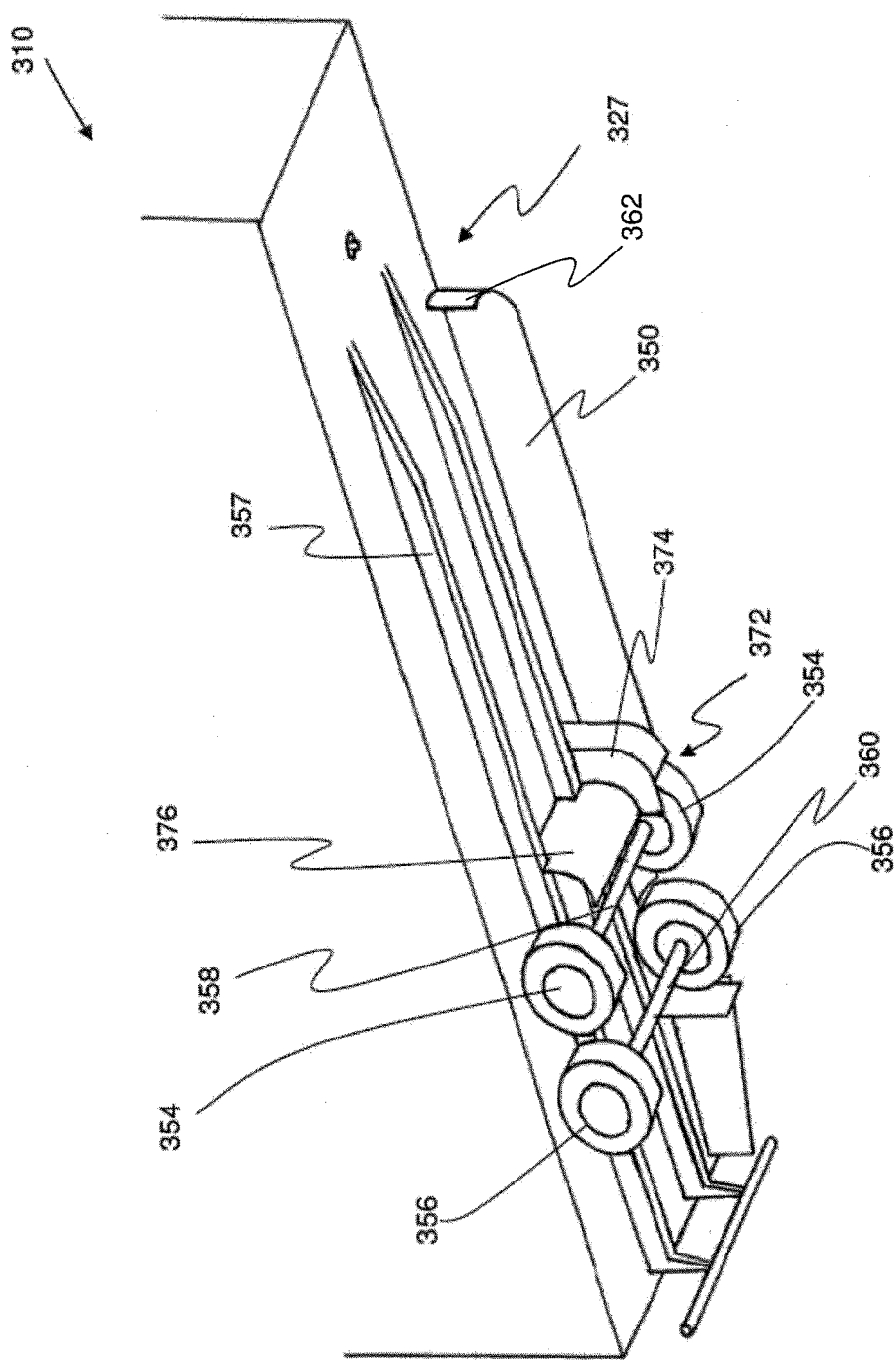
FIG. 5 shows a detailed perspective view of an underside of a yet further alternative trailer.

Referring now to FIG. 5, an underside 327 of a trailer 310 is shown. An underside similar to the underside 327 may be provided on any of the trailers 10, 110 or 210 shown in FIGS. 2 to 4.

The trailer 310 includes two axles 358, 360 each coupled to a wheel 354, 356 on either side of the respective axle 358, 360. The two axles 358, 360 are mounted to the underside of the trailer 310 via an undercarriage 357.

The trailer 310 includes a side skirt 350 that has a leading edge 362 defining a radius about a vertical axis, and which acts as a deflector for directing air flow between wheels 354, 356 on the axles 358, 360 of the trailer 310, i.e. along a central, longitudinal axis of the trailer 310.

A shroud 372 is fitted in front of the leading axle 360, for directing air around the wheels, axle and associated mounting structure. This is described in two parts but may be made as one.

The first part 376 of the shroud 372 is also an air flow deflector. The air flow deflector extends downwardly from the underside 327 of the carrier (or the undercarriage 357) where appropriate. The air flow deflector defines a horizontal radius to deflect airflow downwards around the drag inducing components of the associated axle(s), suspension, brake actuators and all associated mounting brackets.

The first part 376 of the air flow deflector extends approximately one third of the width of the underside 327 of the trailer 310. But in alternative embodiments, the air flow deflector may extend the full width of the underside 327 of the trailer, or alternatively may extend any suitable distance, for example, one quarter, one half, two thirds or three quarters of the width of the underside of the trailer 310.

The second part 374 of the shroud 372 is a wheel member. The wheel member extends downwardly from the underside 327 of the trailer 310 (or from the under carriage of the trailer). The wheel member includes a planar section which transitions to a lower portion defining a radius about a horizontal axis. The wheel member is positioned for directing air flow smoothly around the wheel(s) 354, 356 on the respective side of the trailer 310 and release it in the required direction, i.e. along a central, longitudinal axis of the trailer 310, between the wheels on either side of the axle(s).

The second part 374 extends downwardly from the underside of the trailer 310 (e.g. to the same or similar distance from the road surface as the side skirt 350).

The first part 376 of the shroud 372 may be connected to the second part 374, e.g. by means of a flexible material extending between these parts (e.g. by clip or other connection to said parts 374, 376). Alternatively, the connection between the first part 376 and the second part 374 may be rigid e.g. the first part may be connected to the second part using bolts. The second part 374 of the shroud may be connected to the skirt 350, said connection may be substantially rigid or flexible.

Figure 6:
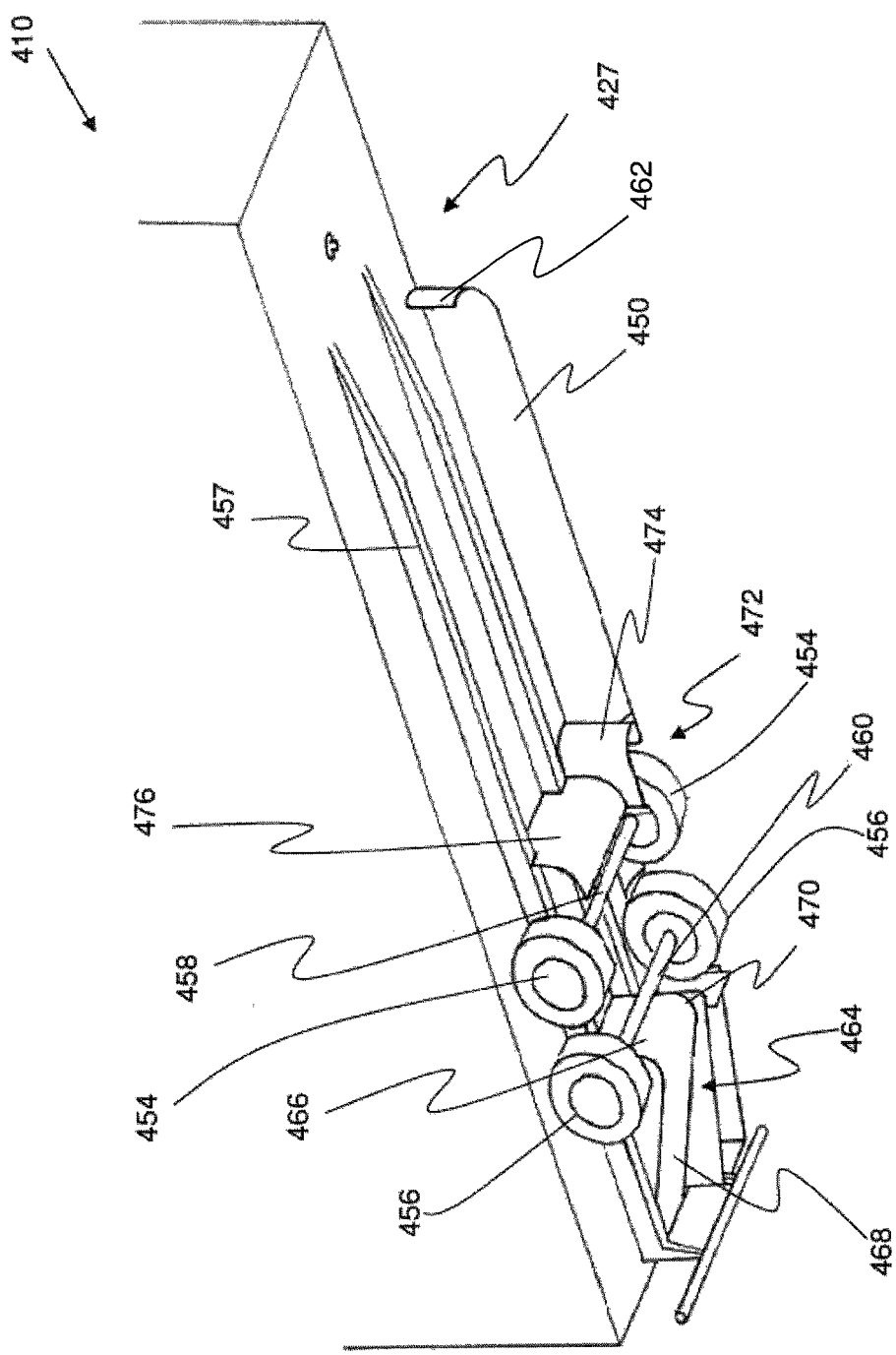
FIG. 6 shows a detailed perspective view of an underside of another alternative trailer.

A further alternative underside 427 of a trailer 410 is shown in FIG. 6. The underside 427 is similar to the underside 327 of the trailer 310. Similar features are given similar reference numerals, but with a prefix "4" instead of a prefix "3", and only the differences will be described.

The underside 427 has a shroud 472, but in this embodiment, the second part 474 is curved about a vertical axis instead of about a horizontal axis.

The trailer 410 includes a rear guide member 464, in the form of a generally triangular sided wedge, which is fitted to or extends from the underside of the trailer 410 and is located between the rear end of the trailer and the rearmost axle 454.

The rear guide member 464 has a leading face 466 which is generally vertical and extends downwardly from the underside of the trailer 410 (e.g. to the same or similar distance from the road surface as the side skirt 450), and a trailing face 468 which is inclined to the vertical and extends in a rearward direction, terminating at or adjacent the rear end of the trailer 410. The deflector 464 has an aerodynamically effective radius 470 (e.g. more than 100 mm, and in the present embodiment the radius is 300 mm) between the leading and trailing faces 466, 468.

The rear guide member 464 extends in a longitudinal direction between the wheels 454, 456 on either side of the trailer 410. In use, the deflector 464 picks up 'dirty' airflow from around the axles 458, 460 and associated components and directs it smoothly in an upwardly direction towards the rear of the trailer 410.

The rear guide member 464 keeps the air flow in the centre of the trailer away from lights, etc.

The rear guide member 464 may be provided in a single part or in multiple parts connected together and/or spaced apart, e.g. the rear guide member may be formed from two subcomponents.

Figure 7:
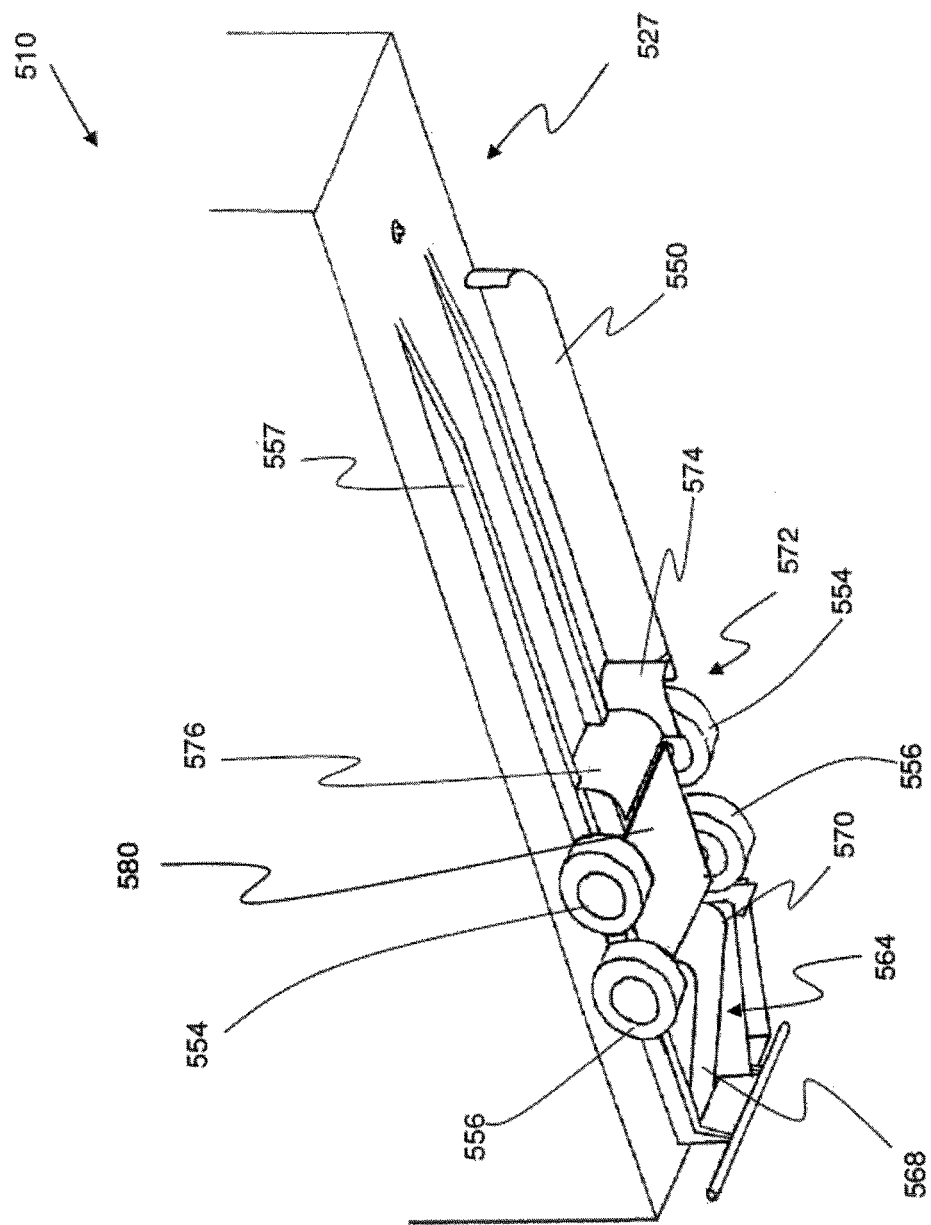
FIG. 7 shows a detailed perspective view of an underside of a further alternative trailer.

A further alternative underside 527 of a trailer 510 is shown in FIG. 7. The underside 527 is similar to the underside 427 of the trailer 410. Similar features are given similar reference numerals, but with a prefix "5" instead of a prefix "4", and only the differences will be described.

In addition to a shroud 572 and a rear guide member 564, a panel 580 is fitted to the axles (not shown in FIG. 7) and extends therebetween. The panel 580 is a flexible sheet, which in this embodiment is manufactured from plastic. The panel 580 is fitted to the axles of the trailer using clamps, but in alternative embodiments other suitable fixtures may be used.

The panel 580 advantageously further improves the aerodynamic efficiency of the trailer by reducing aerodynamic losses associated with air flow in a region of the axles.

Figure 8:
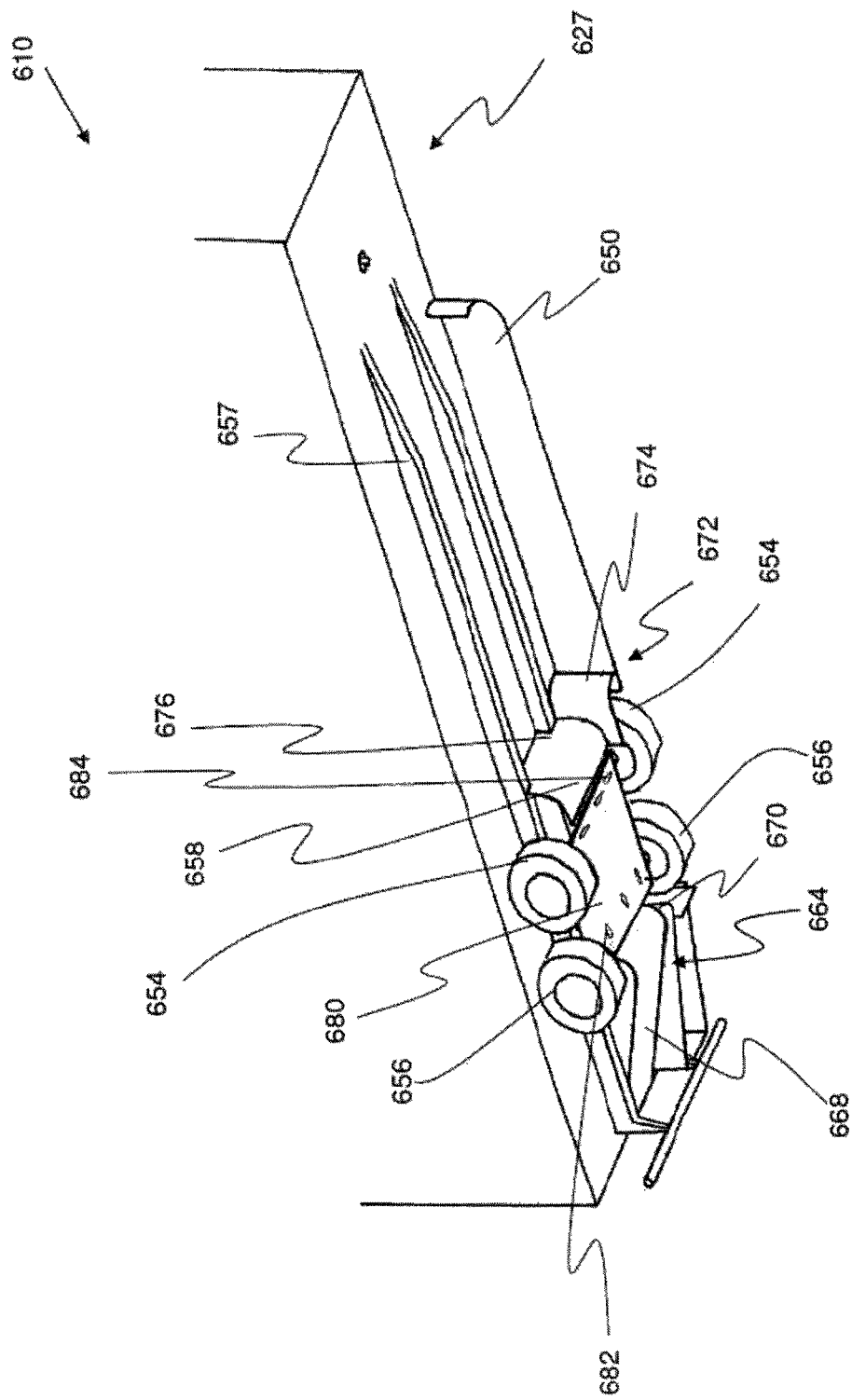
FIG. 8 shows a detailed perspective view of an underside of a yet further alternative trailer.

A further alternative underside 627 of a trailer 610 is shown in FIG. 8. The underside 627 is similar to the underside 527 of the trailer 510. Similar features are given similar reference numerals, but with a prefix "6" instead of a prefix "5", and only the differences will be described.

The underside 627 includes a panel 680 similar to the panel 580 of the trailer 510 of FIG. 7. However, the panel 680 includes slotted holes 682, 684 in a region of each of the two axles (not shown) of the trailer 610. In the present embodiment, the holes 682, 684 are substantially aligned along the length of the axles. In the present embodiment, three holes 682, 684 are aligned with each axle, but in alternative embodiments any appropriate number of holes may be provided, for example four, five or six holes.

As the axles move up and down relative to each other, the distance between them changes. Indeed, even when the axles are seemingly moving in unison, there is some relative movement between them. The holes 682, 684 account for this relative movement by allowing for axle movement in X, Y and/or Z plane. When no holes 682, 684 are provided, as in the embodiment shown in FIG. 7, the material of the panel is selected such that the panel is flexible enough to account for relative movement between the axles.

Bolts extend through the holes to fix the panel 680 to the axles. A washer is used with the bolt, for example a rubber washer. The material of the washer can be selected to permit increased or reduced movement of the panel in an X, Y and/or Z plane.

Advantageously, the panels 580 and 680 are easily removed to ease access to the region of the axles for maintenance.

The panels 580 and 680 have been illustrated in use with two axles, but it is also possible for the panels 580 and 680 to be used with trailers having three axles. In such embodiments, two panels may be used, or a single panel may be used with a connection to the middle axle. Slots similar to slots 582, 584 may be provided in the panel in a region of the middle axle, and substantially aligned with the middle axle. Further, in such embodiments, the panel may be stiffened in a region between the leading axle and the middle axle, and between the middle axle and the trailing axle. For example, an angled element, e.g. a right angled element may be used. The angled element may be made from, for example, aluminium.

Figure 31:
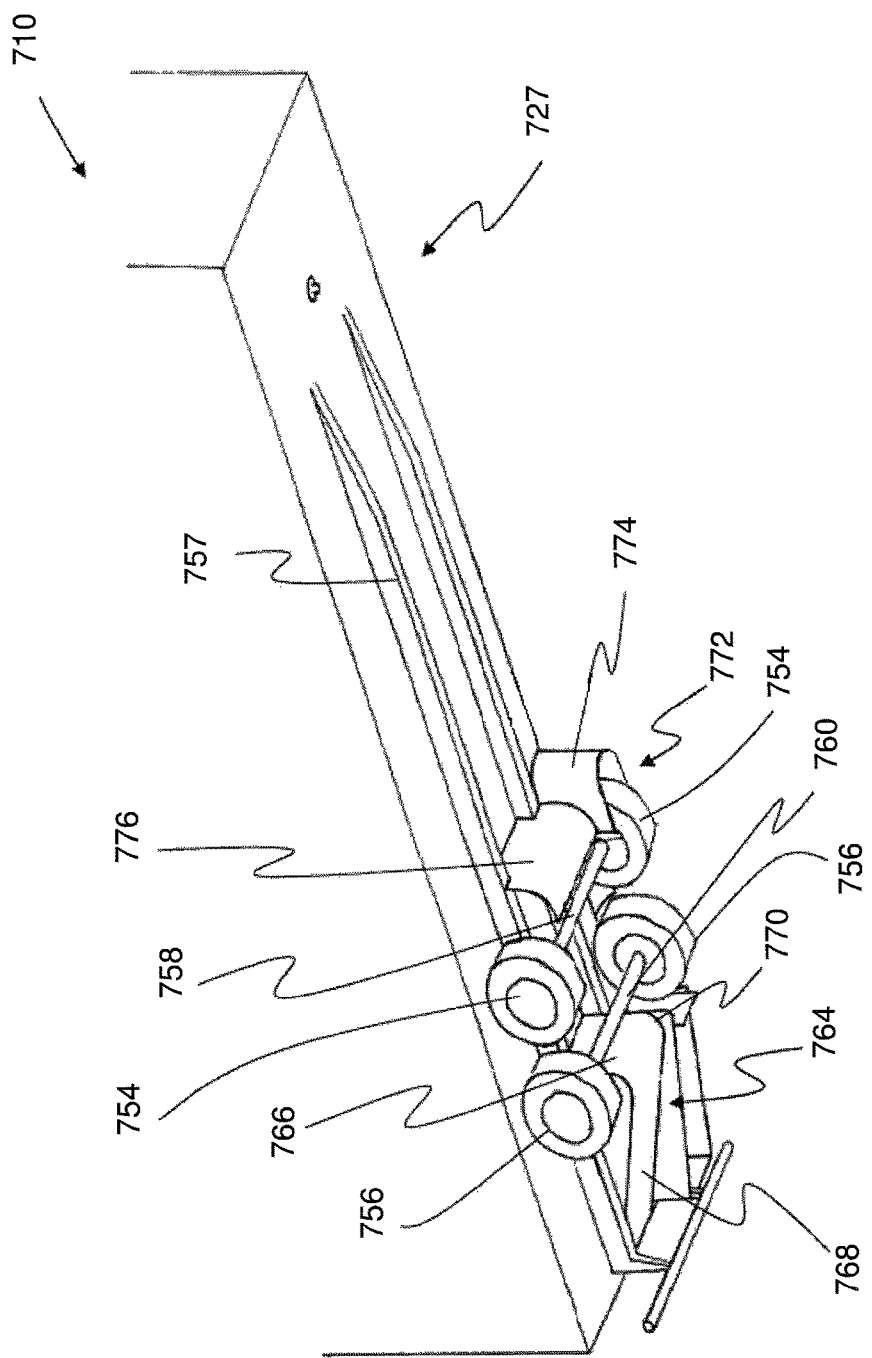
FIG. 31 shows a perspective view of an underside of a road haulage vehicle of a further alternative road haulage vehicle.

A still further alternative underside 727 is shown in FIG. 31. The underside 727 is similar to the underside 427 of the trailer 410. Similar features are given similar reference numerals, but with a prefix "7", instead of a prefix "4", and only the differences will be described.

The trailer 710 does not include a side skirt and instead the wheel member 747 (or wheel deflector) extends to curve around a portion of an inboard and an outboard side of the wheels 754. It has been found that using such a wheel deflector in combination with the air flow deflector 776 and/or the rear guide member 764 can achieve a good proportion of the aerodynamic performance of that of a standard vehicle with a side skirt at lower cost and less propensity to damage.

Referring to FIGS. 9 to 13 a yet further alternative underside 827 of a trailer 810 is shown. The underside 827 is similar to the underside 627 of the trailer 610. Similar features are given similar reference numerals, but with a prefix "8" instead of a prefix "6", and only the differences will be described.

Figure 32:
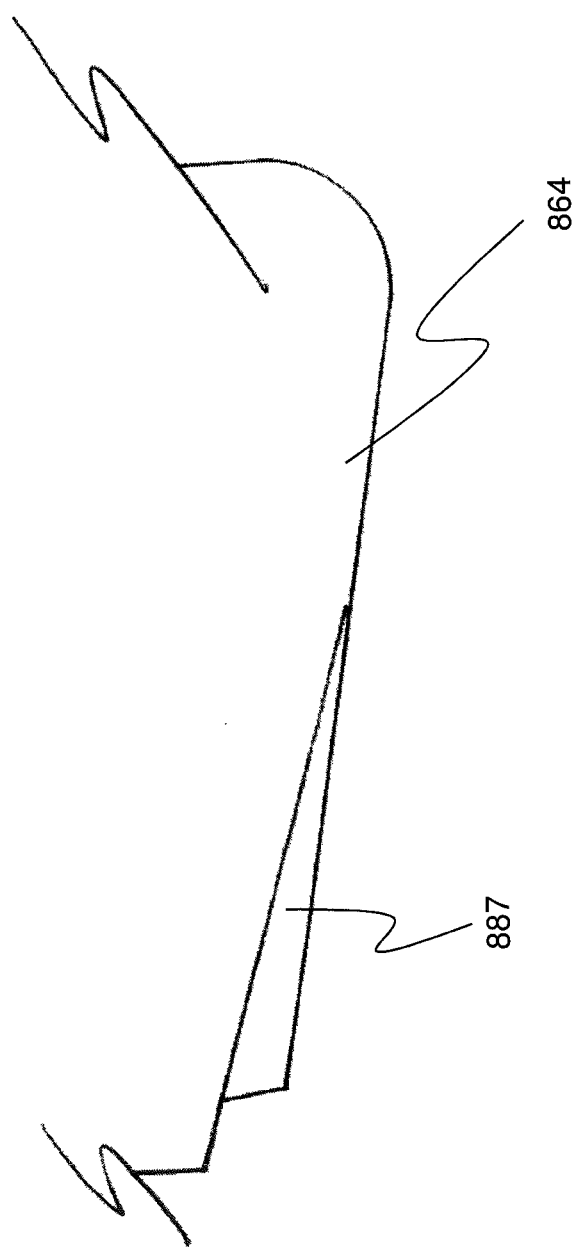
FIG. 32 shows a schematic side view of a section of the rear guide of FIG. 10.

A plurality of vortex generators 883 are provided on the inclined surface 868 of the rear guide member 864. In the present embodiment three vortex generators are provided. The vortex generators form a duct having a narrow neck 885 at an inlet and extending to a wider region 886 at an outlet (i.e. the vortex generator is wishbone shaped). Walls 887 that define the neck and wider region protrude from the inclined surface of the rear guide member 864 so as to define a duct with a sloped base (in the present embodiment the base is formed by the inclined surface of the rear guide member). FIG. 32 shows a schematic of the rear guide member and the vortex generator. Referring to FIG. 32, it can be seen that the walls of the vortex generator protrude from the rear guide member by a varying distance so that a lower end of the wall is angled to the horizontal. However, in alternative embodiments the walls may protrude from the rear so the lower end of the wall is substantially parallel to the horizontal.

The vortex generators extend substantially the full length of the rear guide and are dimensioned to extend substantially across the width of the rear guide.

It has been found that the provision of vortex generators 883 further encourages air flow to exit the underside of the trailer in a general direction of the inclined surface 868 of the rear guide member 864, which improves aerodynamic efficiency. Varying the height of the walls so as to form a planar surface angled to the horizontal has been found to further improve the aerodynamic efficiency of the road vehicle.

The aerodynamic efficiency is further improved by the provision of vertical fins 865 that extend along the sides of the rear guide member. A curved portion 867 is provided at an end of each fin to define a throat region that leads to the rear guide member.

Figure 14:
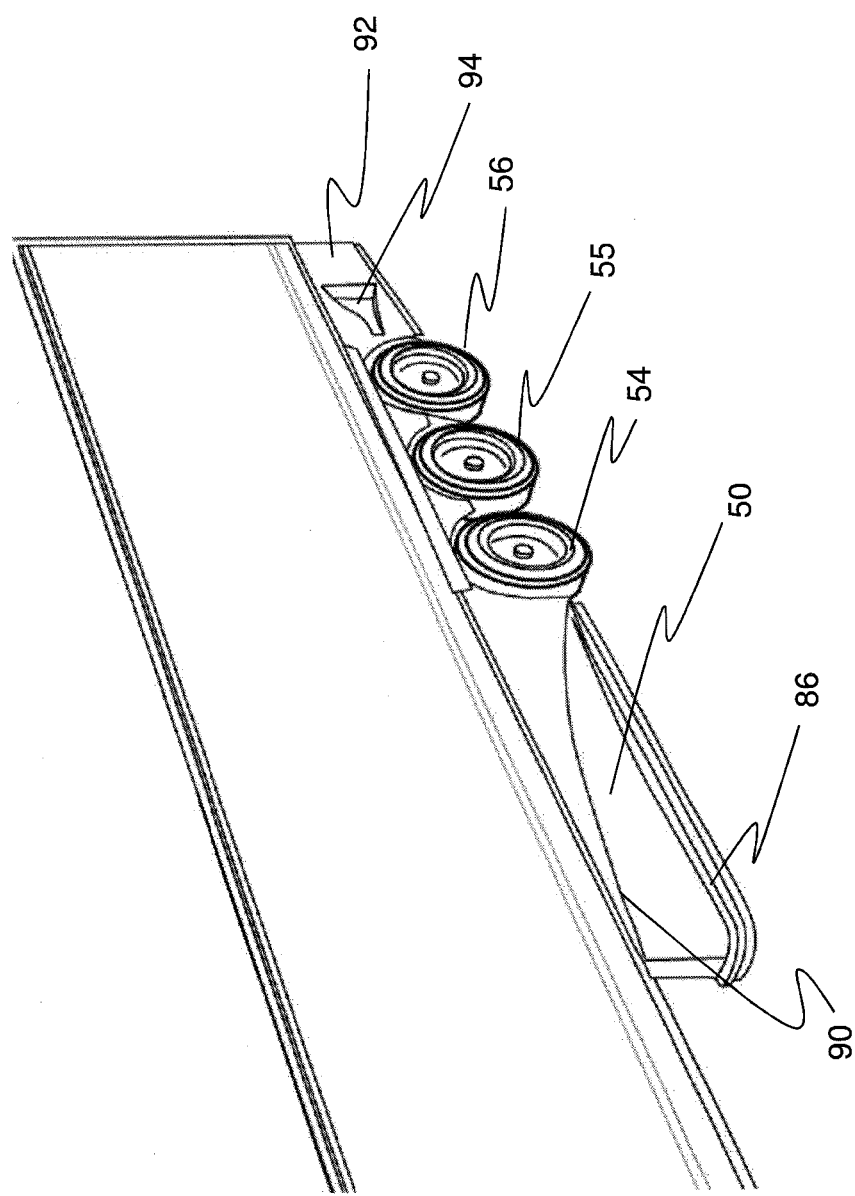
FIG. 14 shows a view of a side of the trailer shown in FIG. 2.
Figure 15:
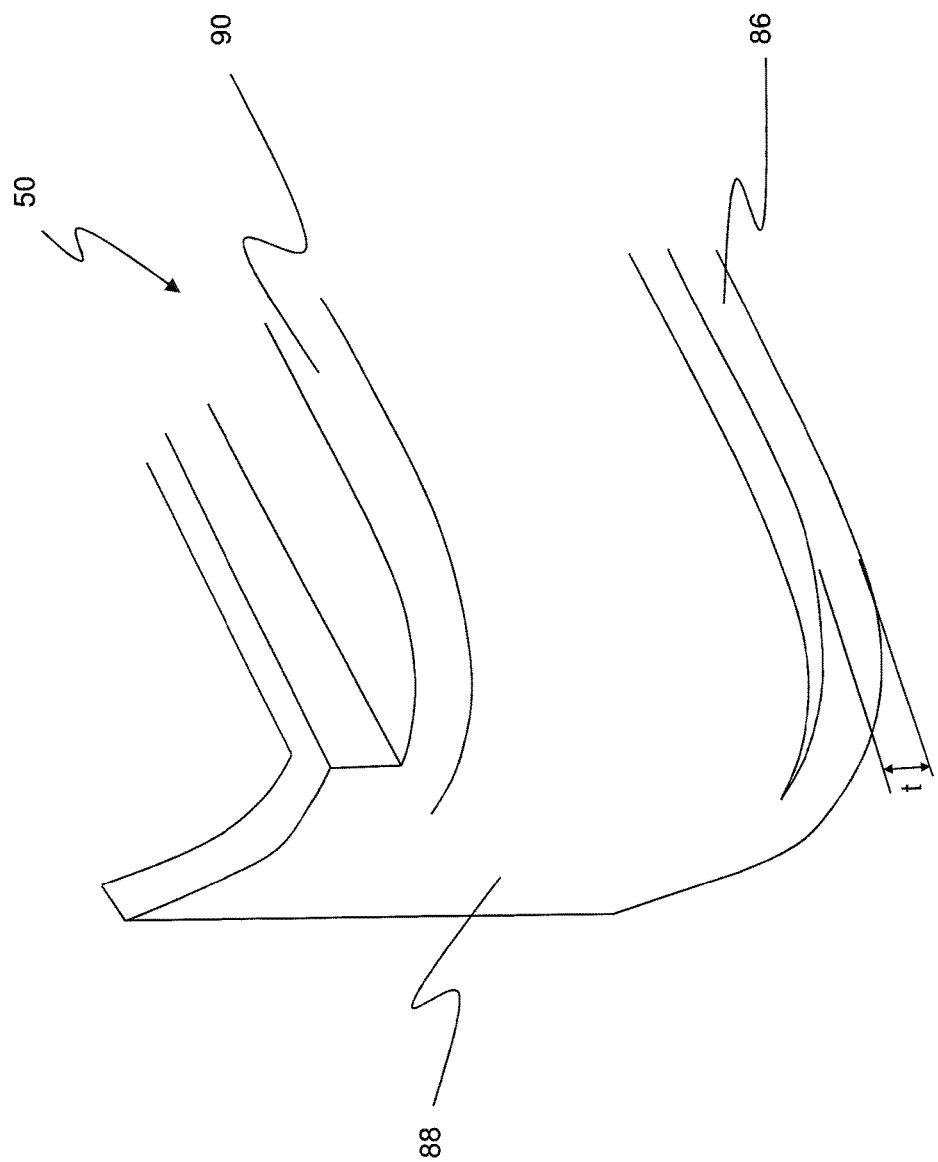
FIG. 15 shows a detailed perspective view of the front of a side skirt of the trailer of FIG. 14 isolated from the trailer.
Figure 16:
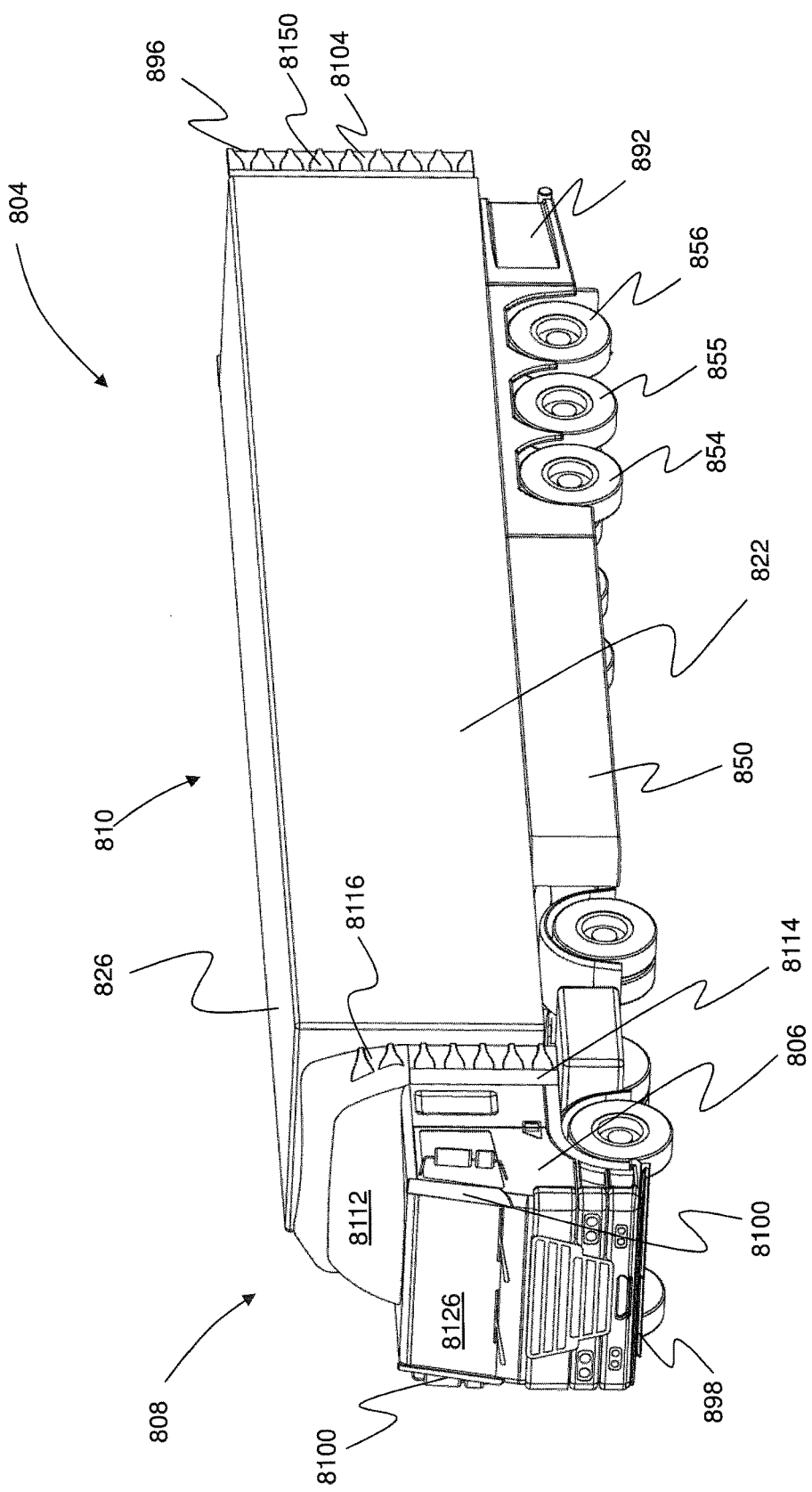
FIG. 16 shows a perspective view from the front of the road haulage vehicle of FIG. 9.
Figure 17:
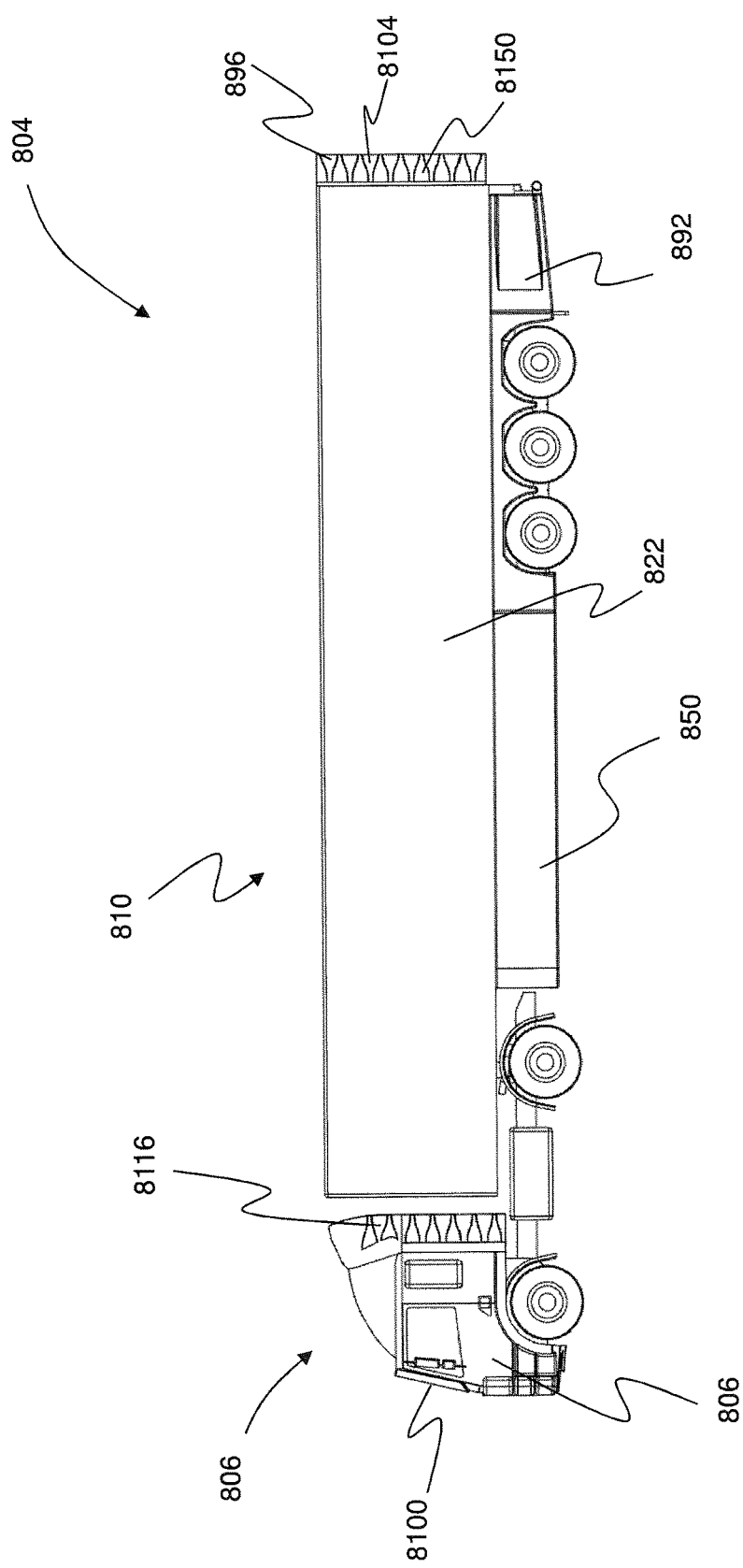
FIG. 17 shows a side view of the road haulage vehicle of FIG. 16.
Figure 18:
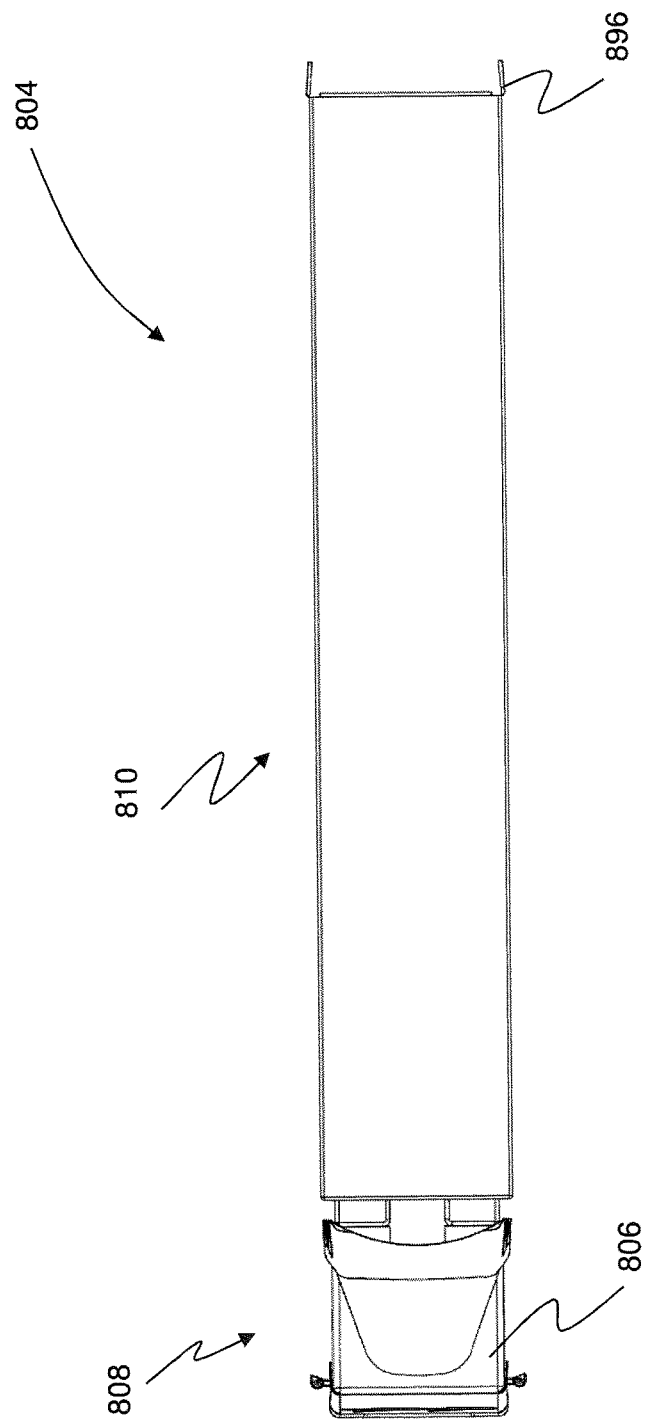
FIG. 18 shows a plan view of the road haulage vehicle of FIG. 16.
Figure 19:
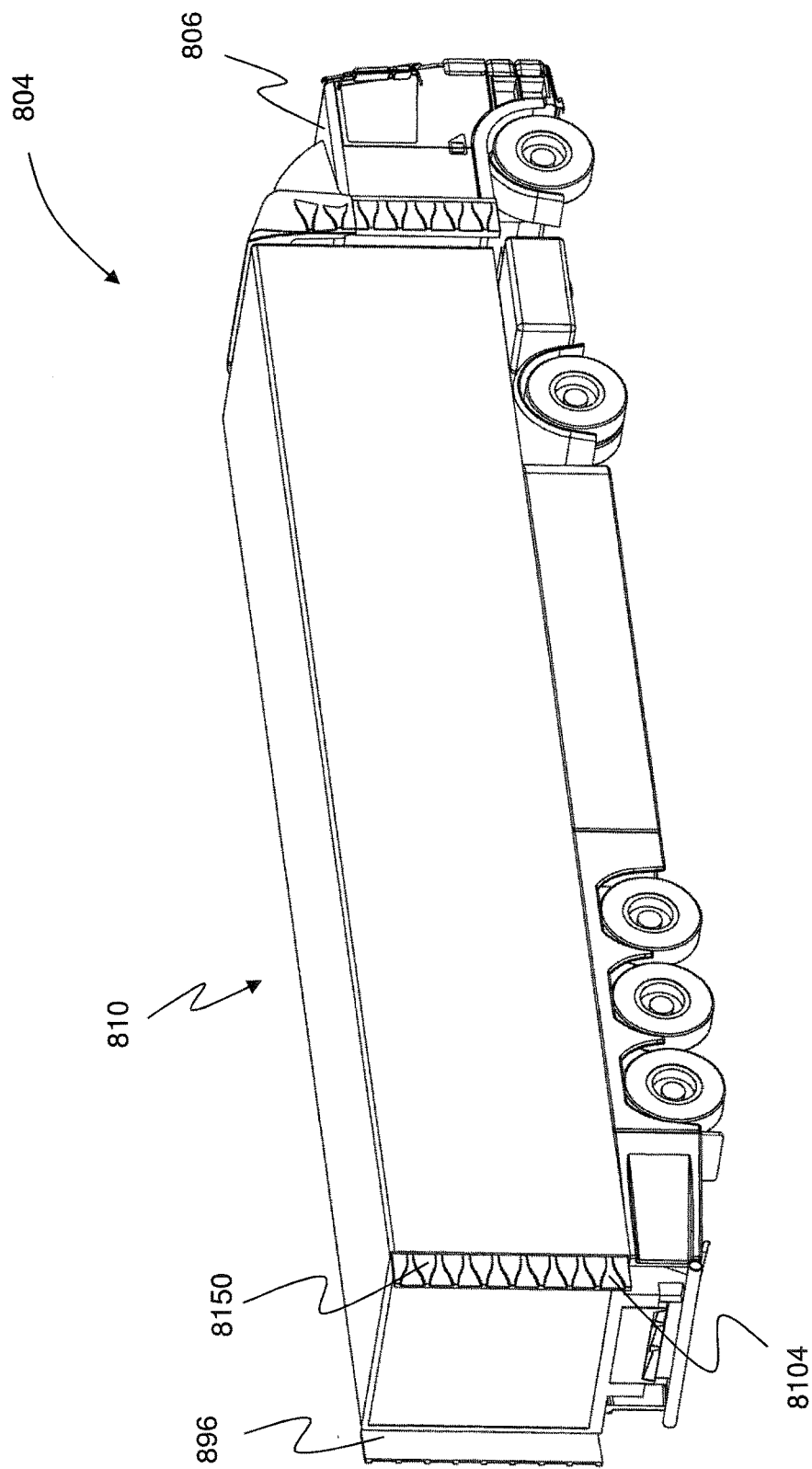
FIG. 19 shows a perspective view from the rear of the road haulage vehicle of FIG. 16.
Figure 20:
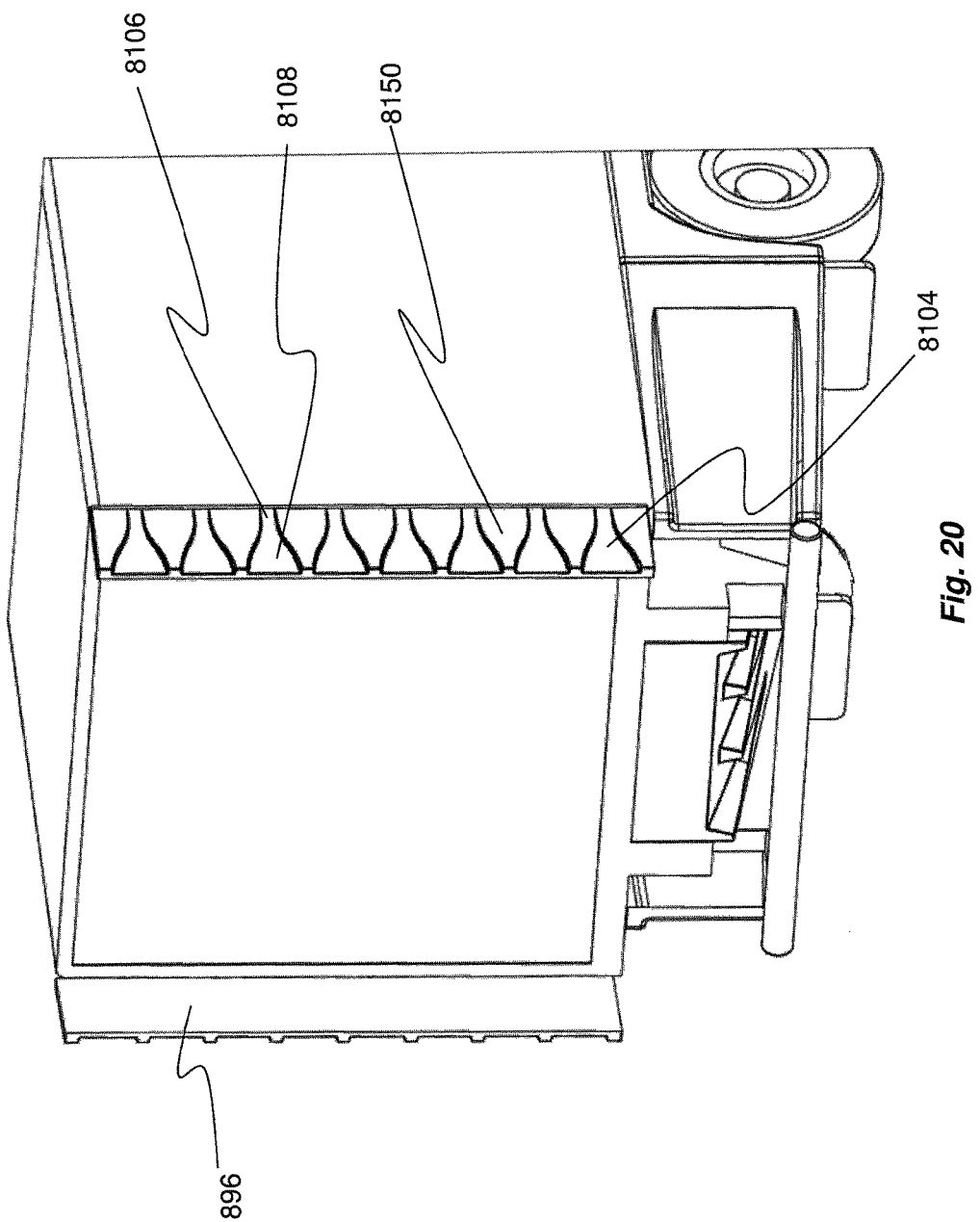
FIG. 20 shows a perspective view at the rear of the vehicle of FIG. 16.
Figure 21:
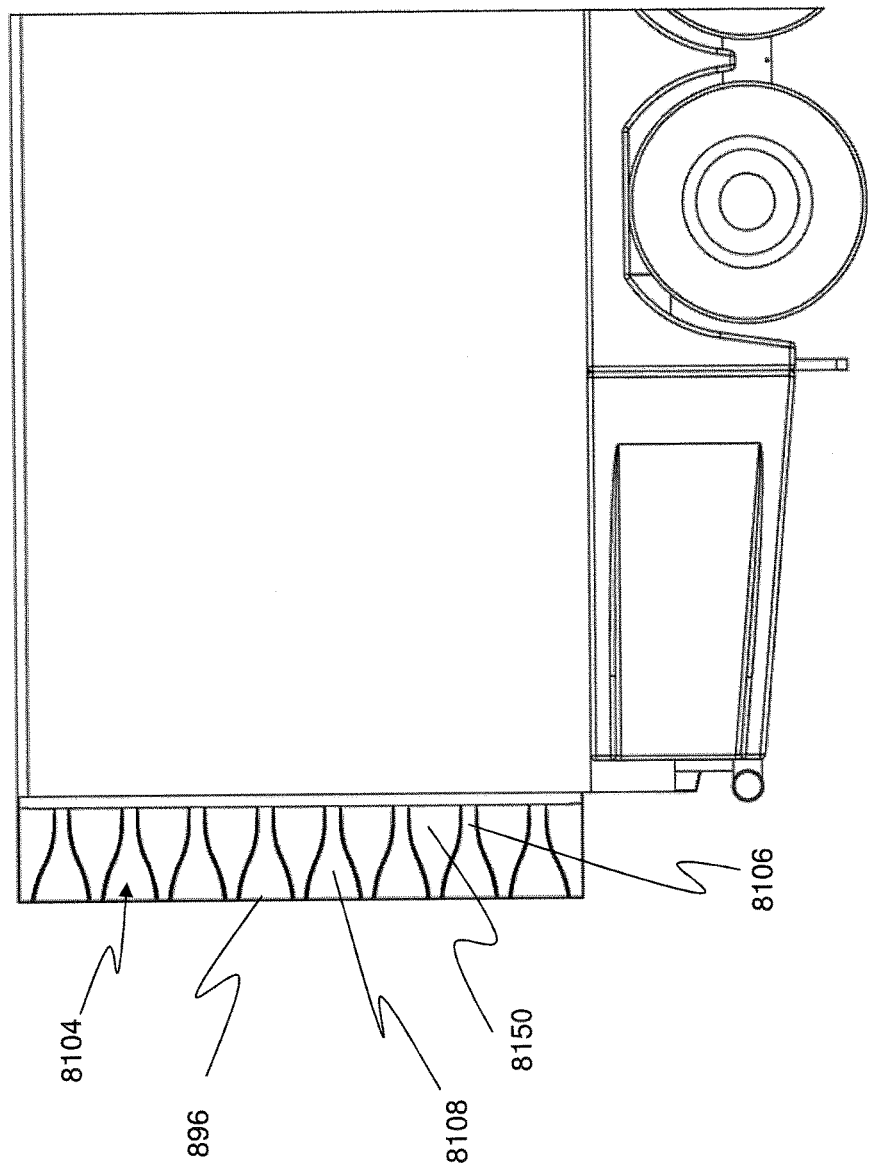
FIG. 21 shows a side view of the rear end of the vehicle of FIG. 16.
Figure 22:
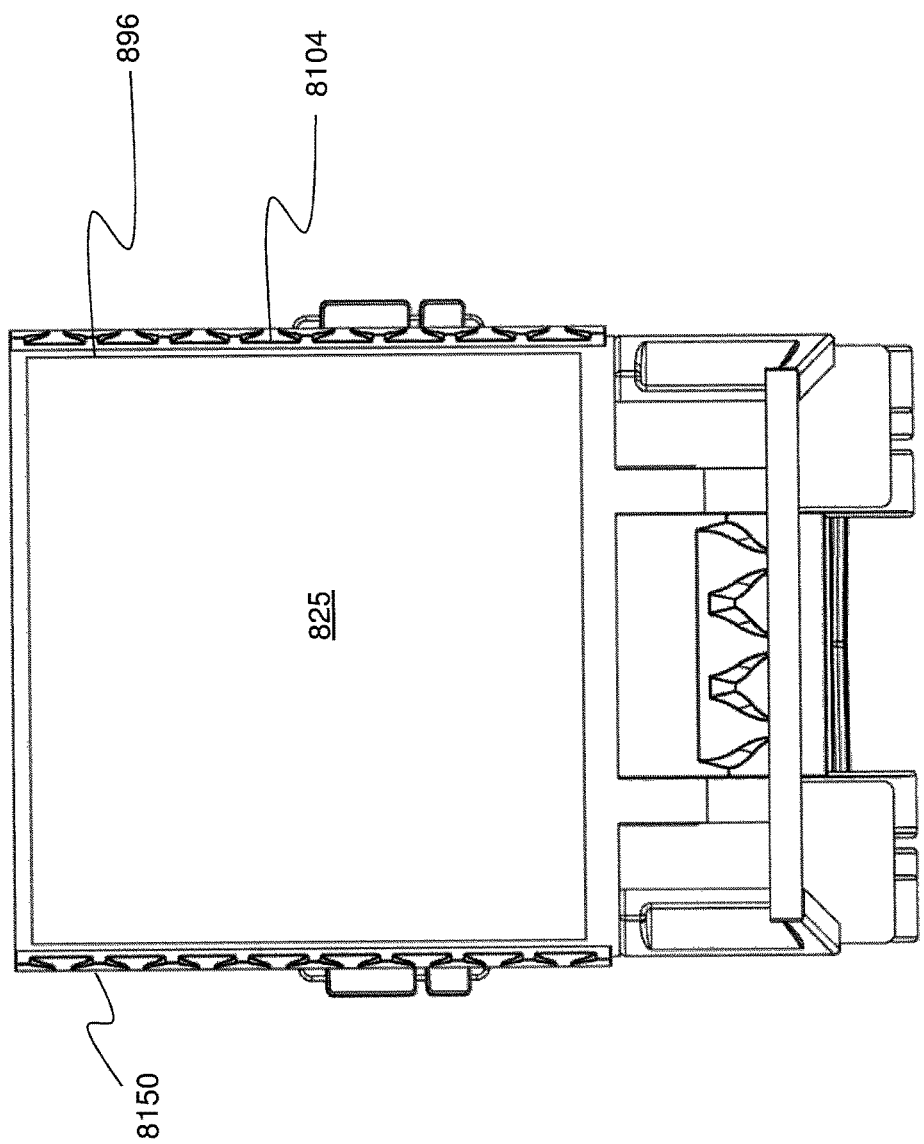
FIG. 22 shows an end view from the rear of the vehicle of FIG. 16.

Referring now to FIGS. 14 and 15, the side skirt 50 of the trailer of FIG. 2 is shown in more detail. The side skirt 50 protrudes downwardly from the two sides 22 of the container towards the ground. A splitter, taking the form of a rib 86 protrudes laterally outwardly from the side skirt. The rib is positioned at a lower end of the side skirt 50.

The rib has a thickness t of about 50 mm, but in alternative embodiments the rib may have any suitable thickness, e.g. a thickness greater than or equal to about 6 mm (e.g. 20 mm). The rib protrudes from the side skirt 50 by a distance of 30 mm. The corners of the rib are rounded to have a radius greater than or equal to 3 mm.

The forward-most end 88 of the side skirt 50 is curved inwardly and extends to a position underneath the underside 27 of the container. The forward-most end of the side skirt (i.e. the portion underneath the underside of the container) does not include a rib (e.g. the forward-most end is planar).

The rib 86 splits air flow transverse to the direction of travel of the trailer 10 so as to reduce the volume of airflow underneath the trailer, which has been found to improve aerodynamic efficiency. The thickness t of the rib and the rounded corner contribute to improving the safety of the trailer, e.g. for persons passing by the side of the trailer.

The trailer 10 is of the type having curtains (not illustrated in FIG. 2, but shown in FIG. 4) that extend the length of the trailer. The curtains are connected to the trailer via hooks that can slide within and/or hook within a recess that runs along a lower portion of the two sides 22 of the container.

The side skirt 50 includes a further splitter for limiting air flow to the recess. The further splitter is also provided in the form of a rib 90 protruding laterally outwards from the side skirt towards an upper end of the side skirt. The rib of the further splitter has dimensions similar to the other splitter towards a forward-most end of the side skirt the distance the rib protrudes from the side skirt then fades towards the rear of the trailer. This is because there is less need to prevent air flow to the recess of the curtains towards the rear of the trailer. In the present described embodiment the rib fades by curving downwardly towards a lower end of the skirt from a forward-most end towards a rearward-most end.

Figure 9:
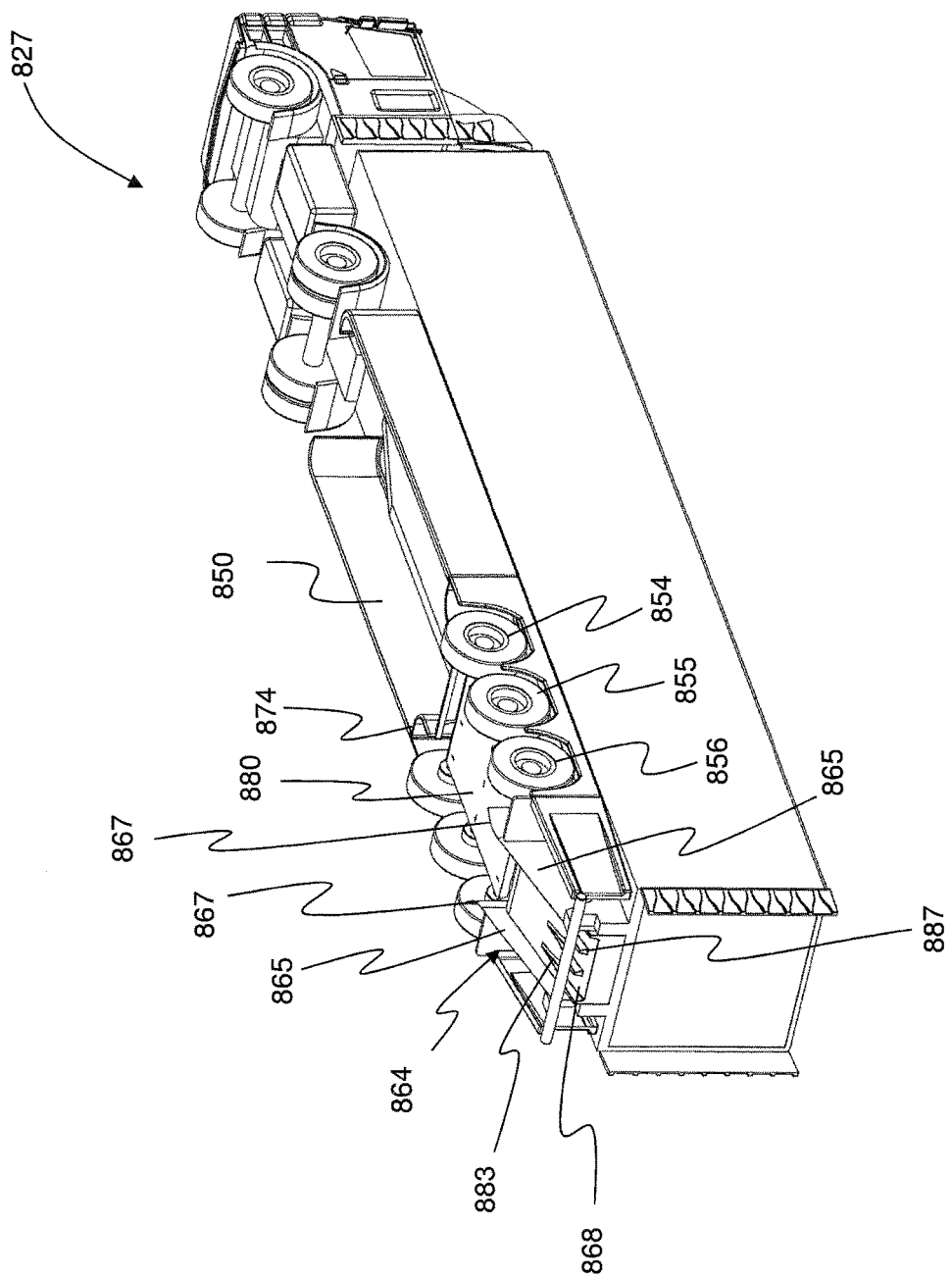
FIG. 9 shows a perspective view of an alternative road haulage vehicle having an alternatively constructed underside.
Figure 10:
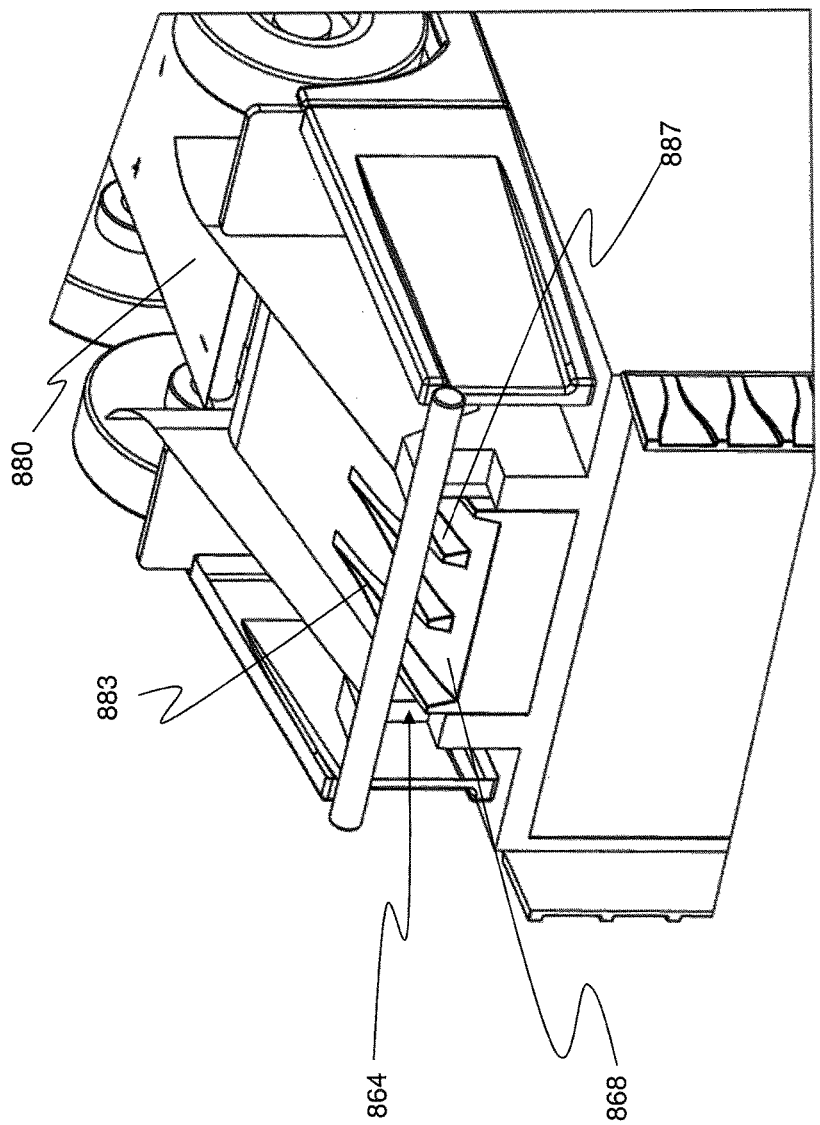
FIG. 10 shows a perspective view of a rear guide of the road haulage vehicle of FIG. 9.
Figure 11:
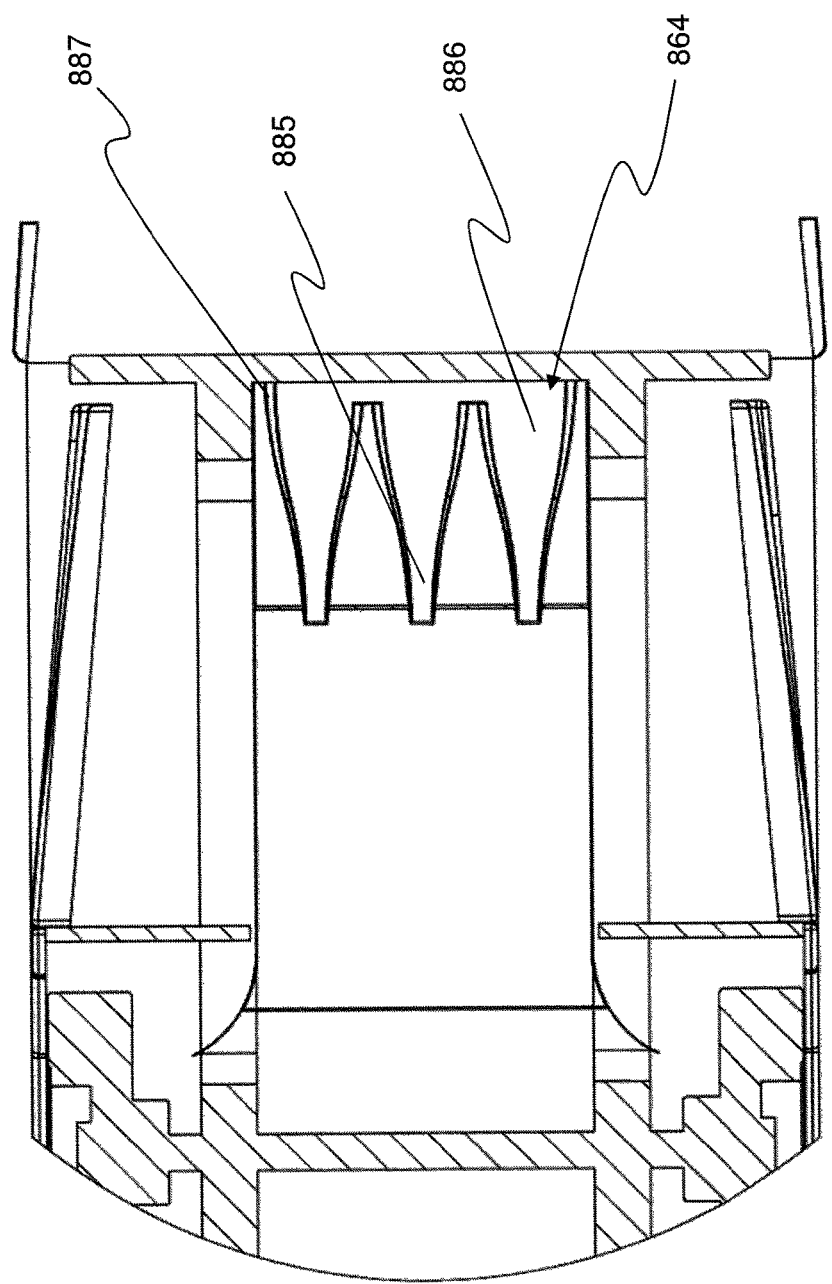
FIG. 11 shows a partially sectioned plan view of the rear guide of FIG. 10.
Figure 12:
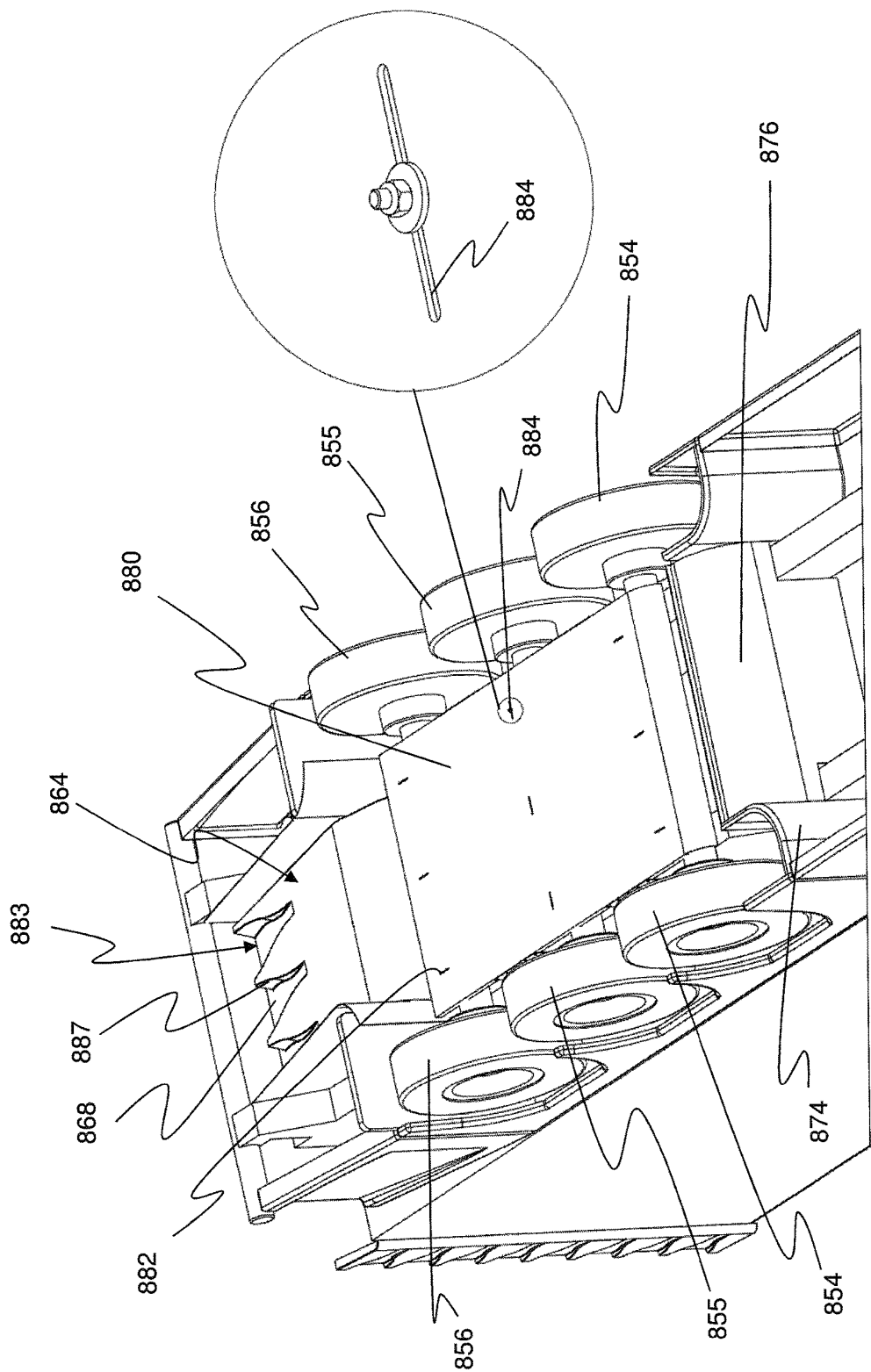
FIG. 12 shows a perspective view of a rear end of the underside of the road haulage vehicle shown in FIG. 9.
Figure 13:
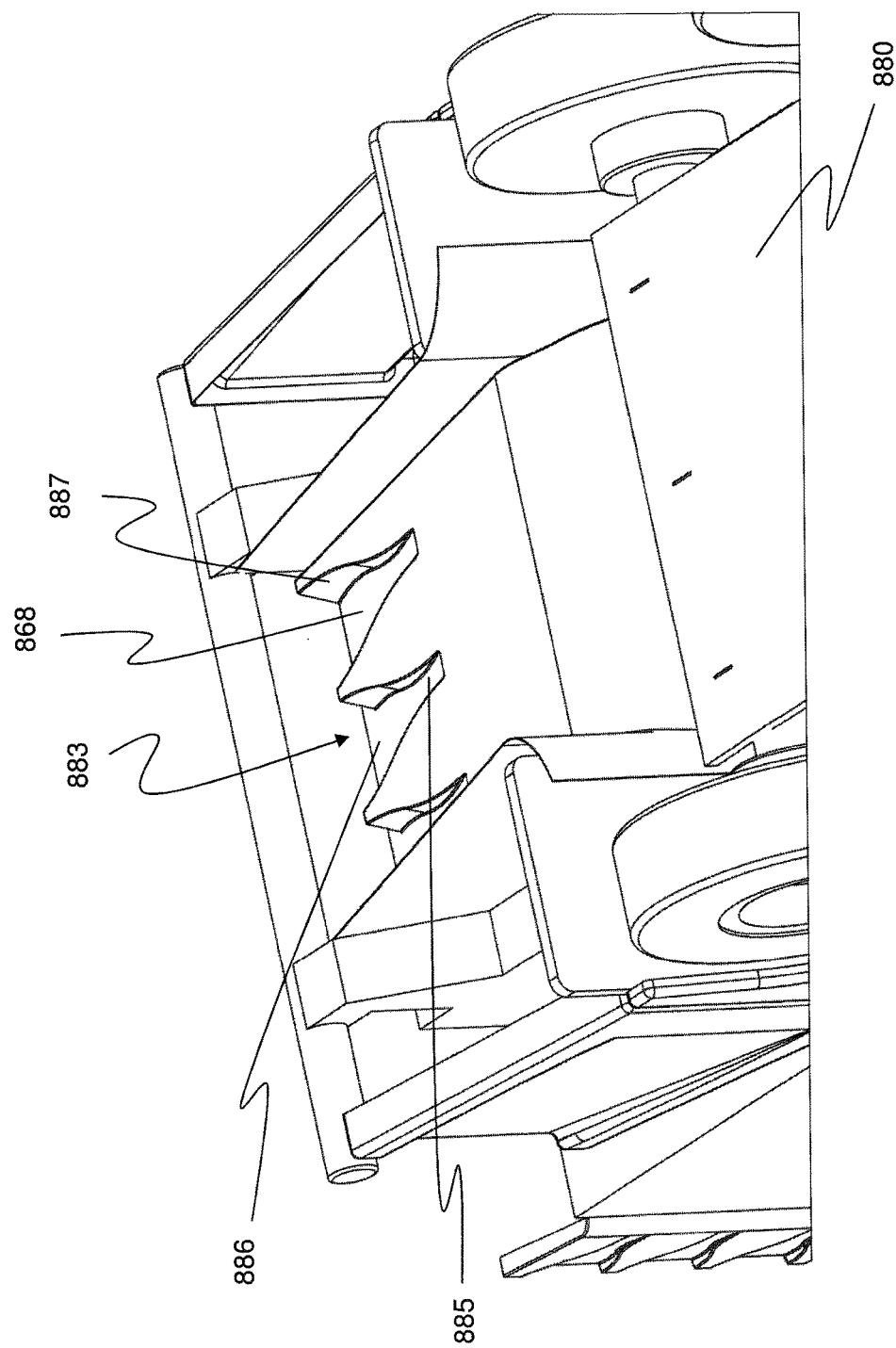
FIG. 13 shows a perspective view of the rear guide of FIG. 10.

The side skirt terminates to provide space for the wheels 54, 55, 56. A rear side skirt 92 is provided rearward of the wheels to direct air flow to a region behind the trailer and/or prevent air flow under the trailer. The rear side skirt is angled towards the rear of the trailer so as to extend from a position substantially adjacent the wheels to a position under the underside of the trailer near the rear of the trailer. In the present embodiment the rear skirt includes an air duct with which air flow can be directed to the rear of the trailer as an alternative to an inward taper skirt. Such an air duct is advantageous for trailers where a tail lift would otherwise impede an inwardly tapered skirt. The air duct is a wishbone shaped recess 94. In alternative embodiments an upper and lower rib may be provided on the rear side skirt (as shown in FIG. 9), or only a lower rib may be provide (as shown in FIG. 3), or no ribs may be provided, or further alternatively no rear side skirt may be provided.

The side skirt 50 is made from a material such that the side skirt does not substantially flex if an obstacle is impacted by the side skirt, i.e. the side skirt could be considered rigid. Providing the splitter on the side skirt reduces the air flow under the trailer, which means the distance the side skirt extends towards the ground can be shortened without a substantial reduction in performance. This is advantageous because it reduces the risk of the rigid side skirt from breaking if the side skirt impacts an obstacle. In alternative embodiments, the side skirt may be made from or made partially from a material such that the side skirt flexes to be displaced to accommodate an obstacle in an impact situation, i.e. the side skirt is made at least in part from a flexible material.

In the present embodiment the side skirt is fixed in position with respect to the sides 22 of the trailer, but in alternative embodiments the side skirt may be raised and lowered, e.g. depending on the speed of the road haulage vehicle. I.e. the skirts may be lowered at higher speeds to improve aerodynamic efficiency and raised at lower speeds to avoid impacting obstacles such as curbs.

Referring to FIGS. 16 to 19 further features of road haulage vehicle 804 are shown. The trailer 810 of the road haulage vehicle 804 is similar to that previously described, in that it has a container defined by a roof 826, an underside 827, a front face 824, a rear face 825, and two sides 822 extending between the front face and the rear face.

As can be seen from FIGS. 16 to 19, the road haulage vehicle 804 includes multiple features that contribute to improving the aerodynamic performance of the road haulage vehicle, these features include: an underside 827 (as previously described); rear or tail deflectors 896 for directing air flow to a region 829 behind the trailer 810, an air dam 898 configured for improving aerodynamic efficiency and reducing the risk of the air dam impacting obstacles such as curbs; A-pillar deflectors 8100; and a series of vortex generators in the form of wishbone shaped ducts positioned on the cab 806 of the tractor unit 808.

Firstly, the tail deflectors 896 will be described in more detail with reference to FIGS. 20 to 23.

The tail deflectors 896 are connected to (but in alternative embodiments, may beformed integrally with) respective sides 822 of the trailer 810, and protrude outwardly in lateral direction, e.g. away from a longitudinal axis (not shown) which extends between the front and rear ends 824, 825 of the trailer and is parallel with the sides 822 of the trailer. Moreover, the tail deflectors 896 extend rearwardly beyond the rear end 825 of the trailer. In this embodiment, the tail deflectors 896 extend beyond the rear end of the trailer by approximately 500 mm, but in alternative embodiment may extend by any suitable distance.

Importantly, each tail deflector 896 includes a surface 8150 arranged or configured for directing air towards the region 829 behind the rear end 825 of the trailer during forward movement of the trailer. Moreover, a forward most portion of the surface 8150 defines a continuation of the respective side face of the trailer, meaning that there is no 'ducting' of air between the side surface 822 of the trailer 810 and the tail deflector 896; the air is picked up and directed by the deflectors, and cannot pass between the deflector and the respective trailer side.

The tail deflectors 896 of the illustrated embodiment have a substantially constant thickness z and are angled in the direction of a region 829 behind the container, so as to, in use, direct air flow to said region behind the container. More particularly, the angle of inclination of the surface 8150 directs air inwardly of a plane coaxial with the respective side face 822 of the trailer.

In alternative embodiments, the tail deflectors 896 are not themselves 'angled', but instead project generally parallel with the side walls 822, yet the rear portion of the outer surface 8150 is arranged at an angle, for directing air inwardly of a plane coaxial with the respective side wall of the trailer. Alternatively, the tail deflectors may have a curved profile, or include a curved outer surface, for directing air flow to the region 829 behind the trailer, i.e. inwardly of a plane coaxial with the respective side face 822 of the trailer.

Directing air flow to the region 829 behind the trailer (i.e. using the tail deflectors) improves the aerodynamic efficiency of the trailer. The present inventor has found that arranging the tail deflectors so that the forward most portion protrudes laterally outwards from the two side faces 822 further improves aerodynamic efficiency. This is thought to be because the air flow has a thick boundary layer towards the rear of the trailer and providing a tail deflector that protrudes laterally from the side of the trailer provides a head in through the boundary layer to better deflect the air flow.

Aerodynamic efficiency is further improved by the provision of a forward-most portion 8102 of the tail deflector that is curved such that the forward-most portion protrudes laterally by an increasing distance from the side face in a rearward direction.

Figure 23:
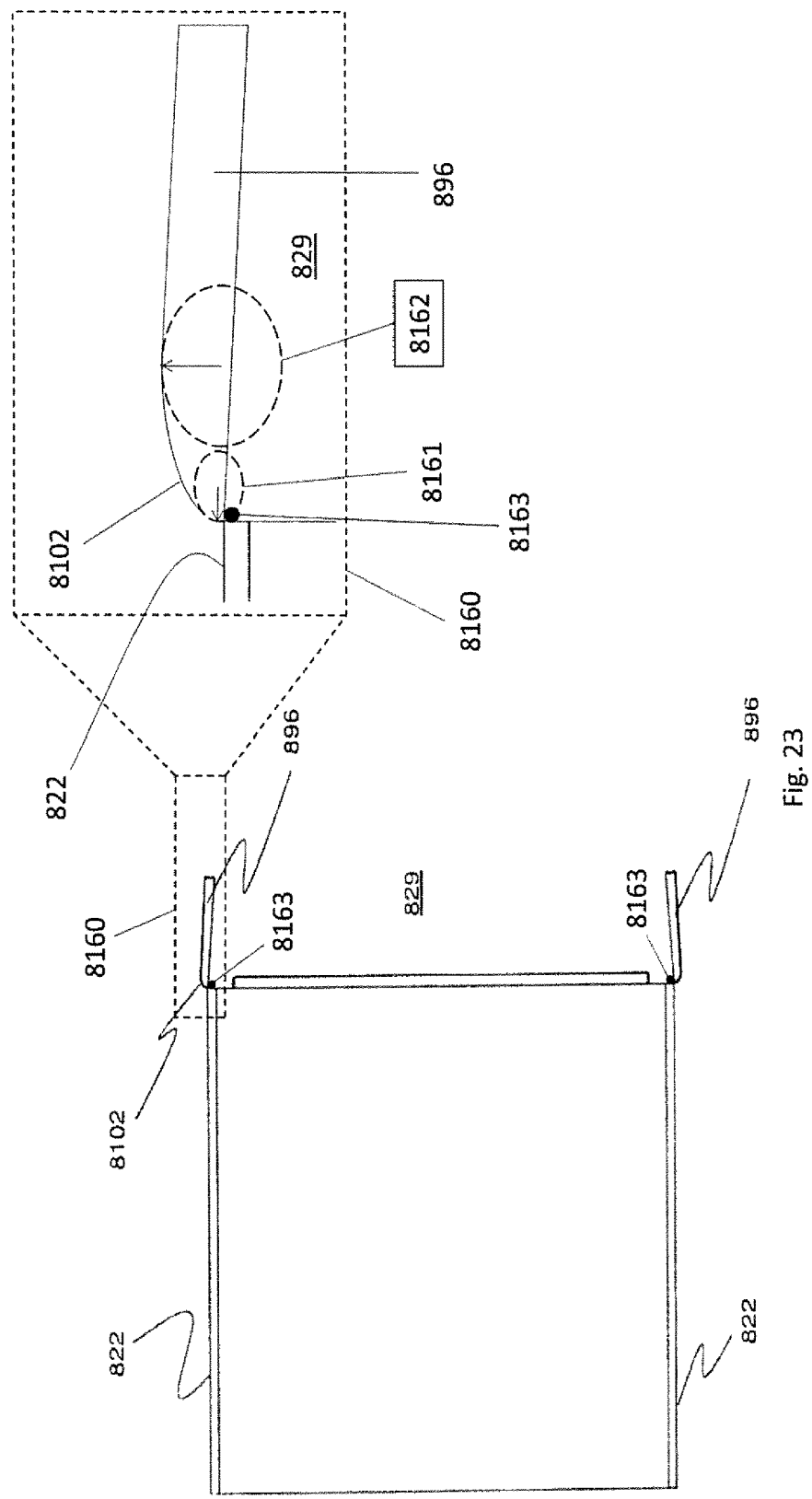
FIG. 23 shows a plan view of the rear end of the vehicle of FIG. 16.

In the present embodiment, as seen by blown-up view 8160 of the tail deflectors 896 in FIG. 23, the curved forward-most portion 8102 defines a convex curved surface having a radius that increases from a minimum radius 8161 at a forward-most end to a maximum radius 8162 at a rearward-most end. In alternative embodiments, the forward-most portion may define an angled surface instead of a curved surface or may define a curve of constant radius.

In this embodiment, each tail deflector protrudes by a distance of approximately 50 mm from a respective side of the container.

The deflectors may be mounted via a mechanism 8163 such that they can fold on to the rear face of the trailer 825 and/or the sides 822 for maneuvering and/or loading. The mechanism 8163 may be manual, hydraulic, pneumatic or electric. In some embodiments the mechanism 8163 may be actuated based on the speed of the vehicle. The sensors and circuitry required for such a mechanism would be clear to the person skilled in the art. The aerodynamic efficiency of the trailer 810 is yet further improved by the provision of a plurality of vortex generators 8104 in the form of wishbone shaped ducts on the two tail deflectors. Each vortex generator defines an air flow path having a neck 8106 towards a forward-most end of the tail deflectors and a wider region 8108 towards a rearward-most end of the tail deflectors. A base of the vortex generator is sloped towards a region behind the rear face of the trailer. The walls defining the air flow path are also sloped but to a lesser extent to the base. This has been found to improve the aerodynamic performance of the vortex generators. However, in alternative embodiments the walls may extend to have a surface substantially parallel to the sides of the trailer. In the present embodiment the walls protrude by a distance of approximately 20 to 40 mm.

The vortex generators 8104 are provided along the full height of the tail deflectors 896 (i.e. extending from the underside 827 to the roof 826 of the trailer 810). The length of the vortex generators is such that the vortex generator extends substantially the full length of a planar region 8110 of the tail deflector 896 (i.e. the full length of the tail deflector excluding the curved forward-most portion 8102). In the present embodiment eight vortex generators are provided, but in other embodiments any suitable number of vortex generators may be provided.

It is believed that the shape of the duct and the downward slope of the duct creates two vortices of air that deflect the boundary layer and permit faster moving air to be drawn into the duct and directed to a region behind the rear face of the trailer. In addition to this, the slope also provides improved direction to air flow through the duct permitting air flow to more effectively be directed to a region behind a rear face of the trailer unit to further improve aerodynamic efficiency.

Figure 24:
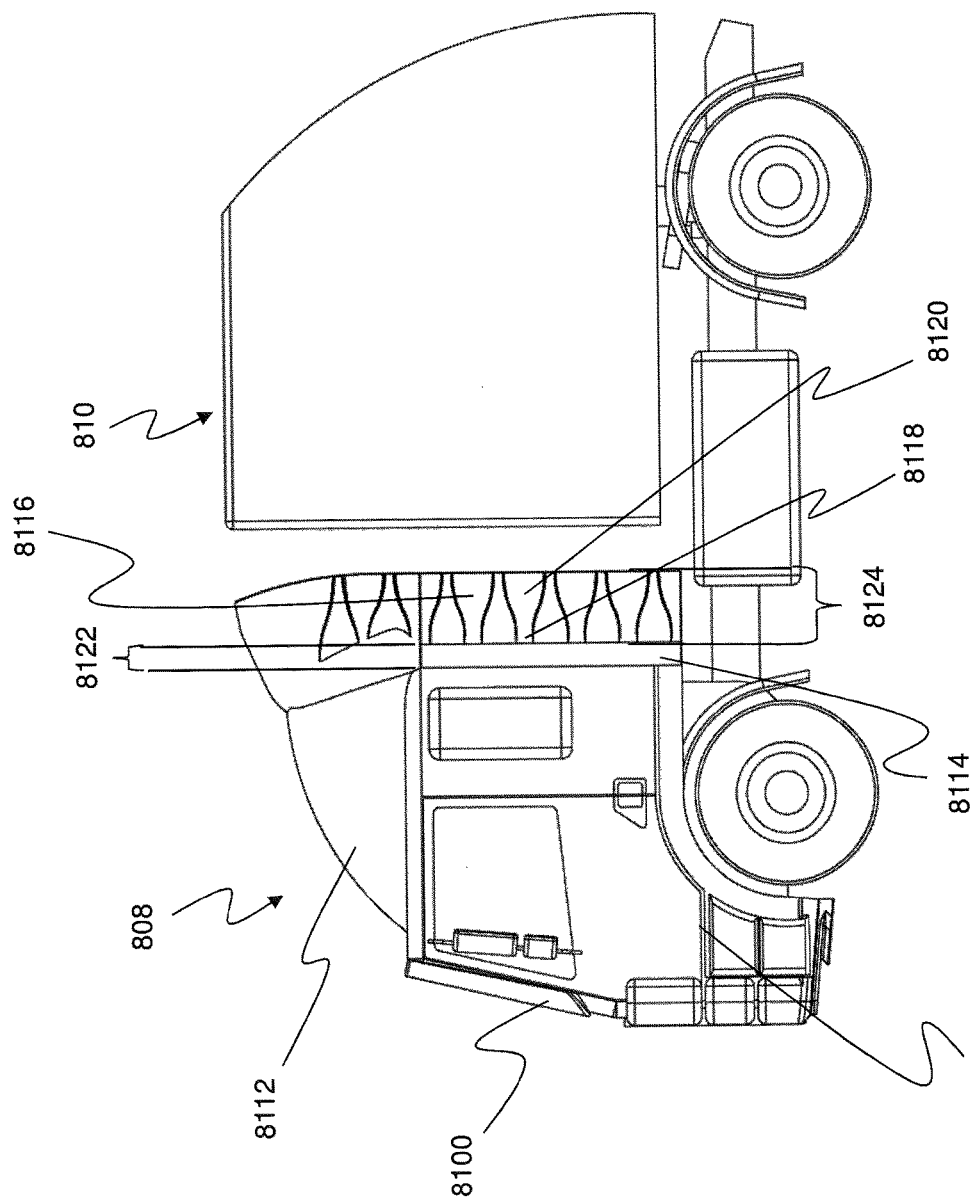
FIG. 24 shows a side view of the front end of the vehicle of FIG. 16.
Figure 25:
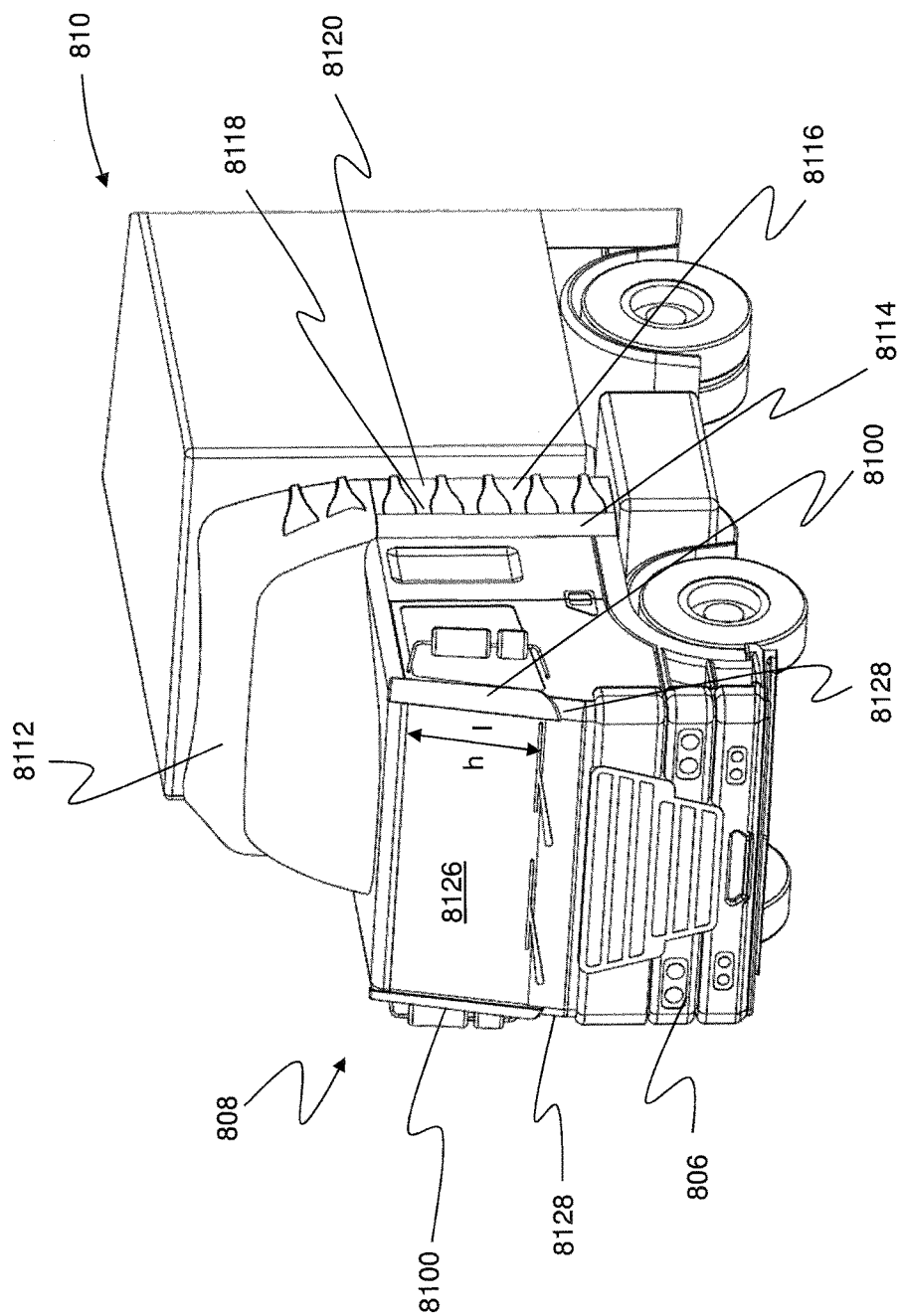
FIG. 25 shows a perspective view from the front of the front end of the vehicle of FIG. 16.

Referring to FIGS. 24 and 25, the vortex generators 8116 positioned on the cab 806 of the tractor unit 808 are shown in more detail.

The cab 806 has a roof fairing 8112 and a side fairing 8114. The general construction of the roof fairing and side fairing is known in the art so is not described further here.

A plurality of vortex generators 8116 are provided along the side fairing 8114 and on part of the roof fairing 8112. Each vortex generator defines a duct having a neck 8118 towards a forward-most end of the side fairing and roof fairing and a wider region 8120 towards a rearward-most end of the side fairing and roof fairing (e.g. the duct is wishbone shaped). A base of the duct is a base of the duct is substantially parallel to a side of the cab, but in alternative embodiments the base may be sloped inwardly towards the side of the cab, e.g. sloped inwardly by approx. 7°.

The side fairing has a curved portion 8122 in a forward-most region that curves from a position adjacent the cab to a position adjacent a planar portion 8124 of the side fairing that extends in a forward-rearward direction. The vortex generators are positioned on the planar portion of the side fairing and extend the full length of the planar portion. The planar portion is approximately ¾ of the length of the entire side fairing. In the present embodiment, the vortex generators protrude (at a maximum) from the fairing by approx. 25 to 50 mm, but in alternative embodiments the vortex generators may protrude by any suitable distance.

Four vortex generators 8116 are provided along the side fairing 8114 with half a vortex generator provided at the top and bottom of the side fairing. Two vortex generators are provided on the roof fairing 8112, but in alternative embodiments an alternative number of vortex generators may be provided.

In the present embodiment, the vortex generators 8116 are integrally formed with the side fairing 8114 and roof fairing 8112, but the vortex generators may alternatively be connected to the side fairing e.g. via fasteners, for example bolts.

The provision of the vortex generators 8116 keeps the airflow aligned with the sides of the trailer 810 despite the gap between tractor and trailer. This is instead of the air being thrown outwardly, which is what often happens in conventional designs of side fairings.

Figure 26:
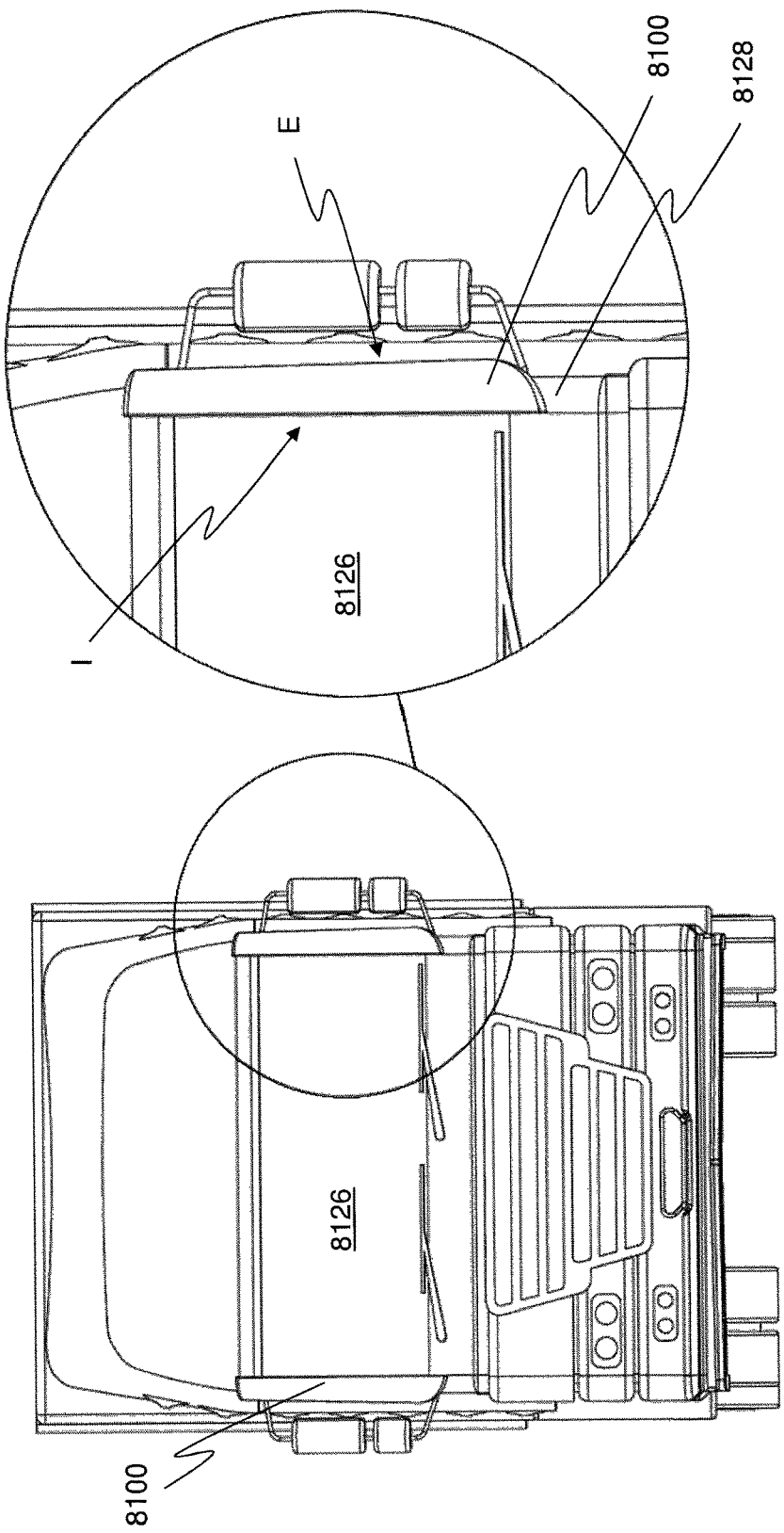
FIG. 26 shows an end view from the front of the vehicle of FIG. 16 and a detailed view of an A-pillar deflector of the vehicle of FIG. 16.
Figure 27:
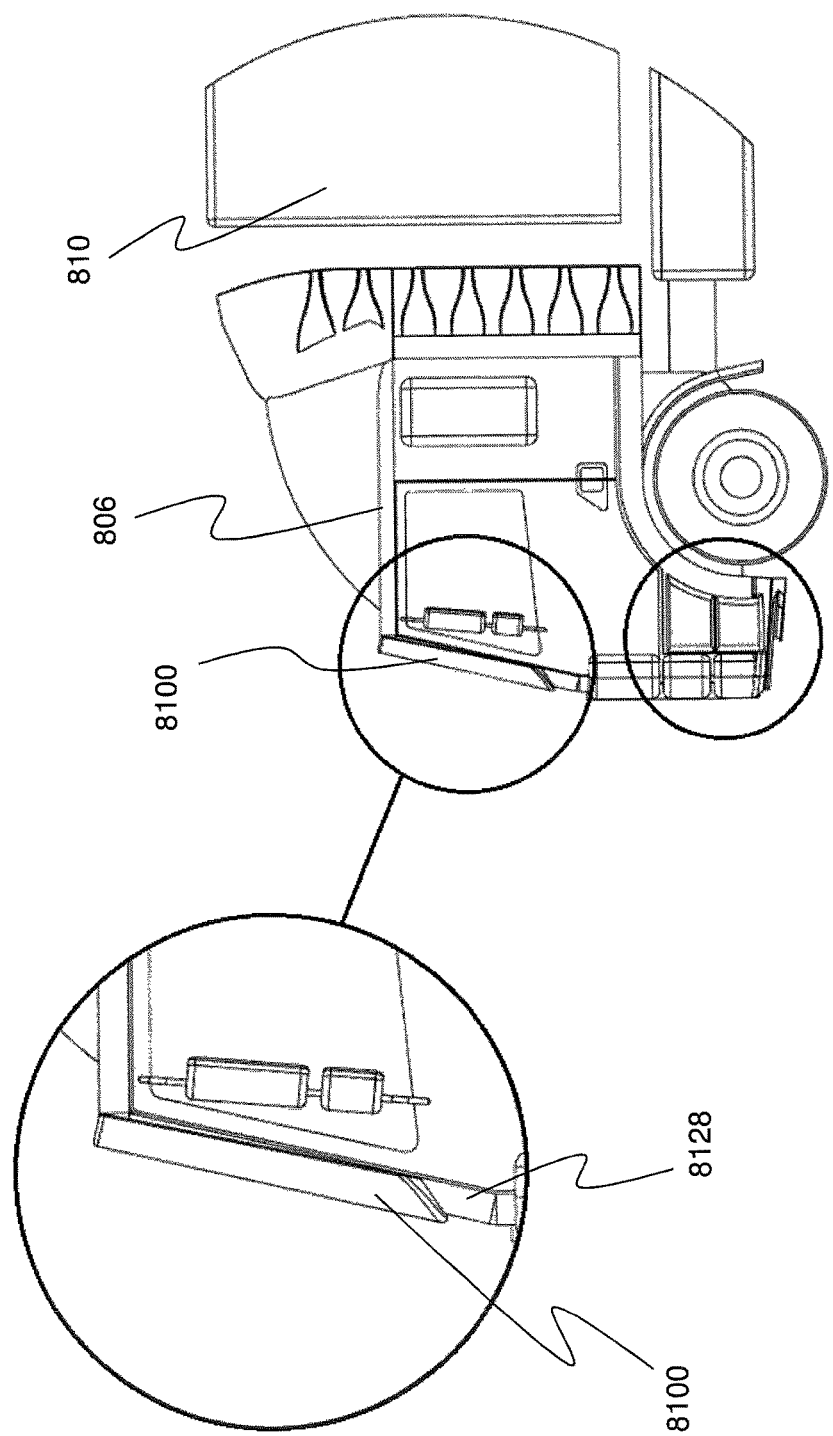
FIG. 27 shows a side view of the front end of the vehicle of FIG. 16 and the A-pillar deflectors.

Referring now to FIGS. 26 and 27 the A-pillar deflector 8100 will be described in more detail. The cab 806 has a windscreen 8126 that is supported on each lateral side by an A-pillar 8128. The A-pillar deflectors are provided on each of the A-pillar supports. The A-pillar deflectors extend along the height of the A-pillars by a distance in excess of the full height h of the windscreen.

Each A-pillar deflector 8100 has a curved profile that curves laterally outwardly from a position adjacent the lateral sides of the windscreen 8126 to a direction generally towards a rear of the vehicle. The curved profile of the A-pillar deflectors is such that the A-pillar deflectors define a convex curved surface that has a radius that increases from a minimum at forward-most end to a maximum at a rearward-most end. In an alternative embodiment, the radius of the A-pillar deflector may be constant.

The provision of A-pillar deflectors 8100 has been found to further improve the aerodynamic performance of the vehicle 804 by directing air flow along the side of the cab 806. The A-pillar deflectors have been found to improve aerodynamic performance above that of cabs that simply have curved A-pillars.

Each A-pillar deflector has an intake area I adjacent the windscreen and an exit area E spaced from and rearward of the windscreen. The intake area may be greater than the exit area due to a reduction in height or width or both, e.g. the reduction in height or width may be in the order of 10 to 20%. In the present embodiment, the reduction is due to a change in height achieved by providing a curved lower end of the A-pillar deflector. The change in height further improves the aerodynamic performance of a road haulage vehicle.

Figure 28:
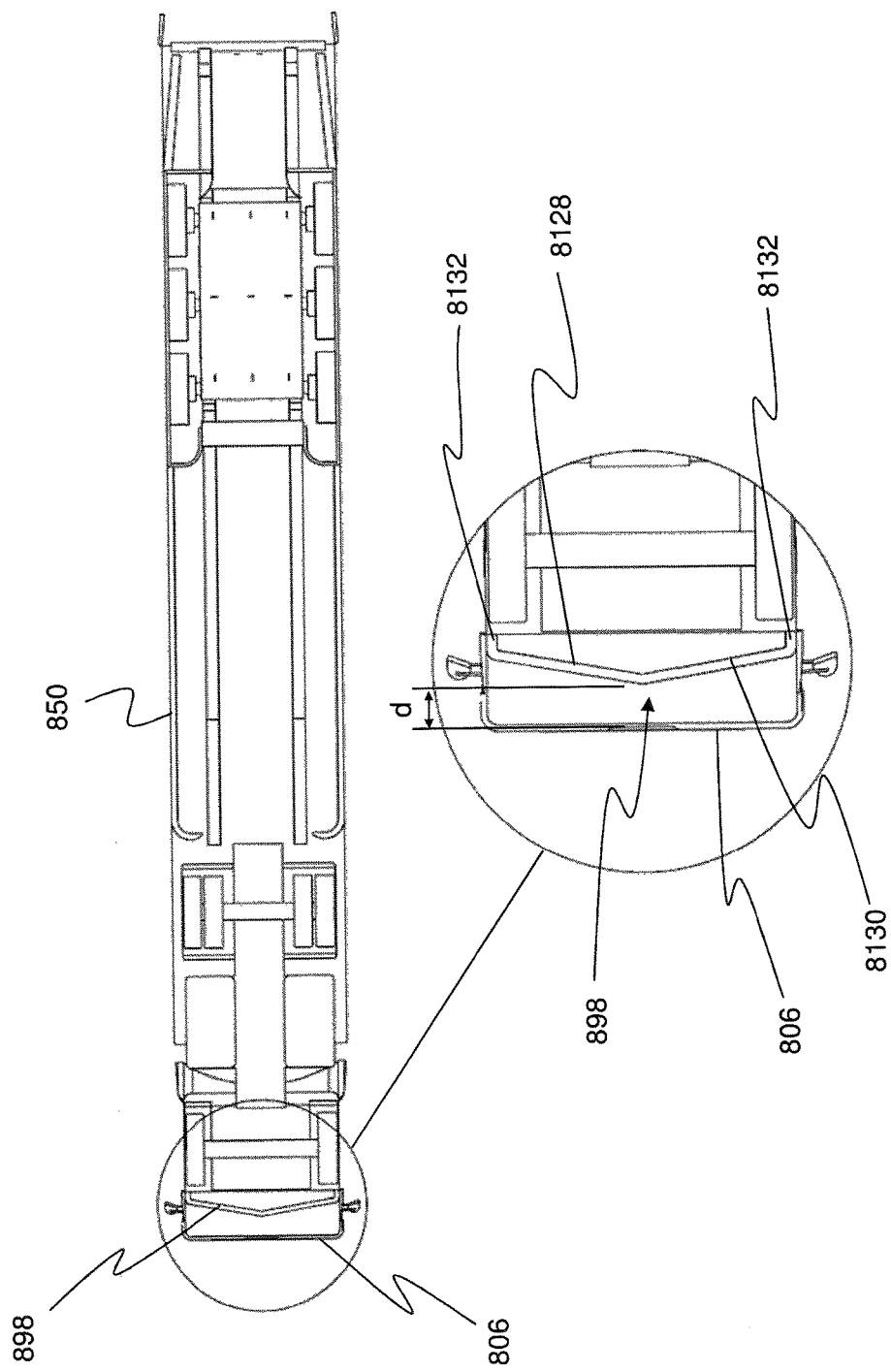
FIG. 28 shows a plan view of an underside of the vehicle of FIG. 16 and a detailed plan view of an air dam of the vehicle of FIG. 16.
Figure 29:
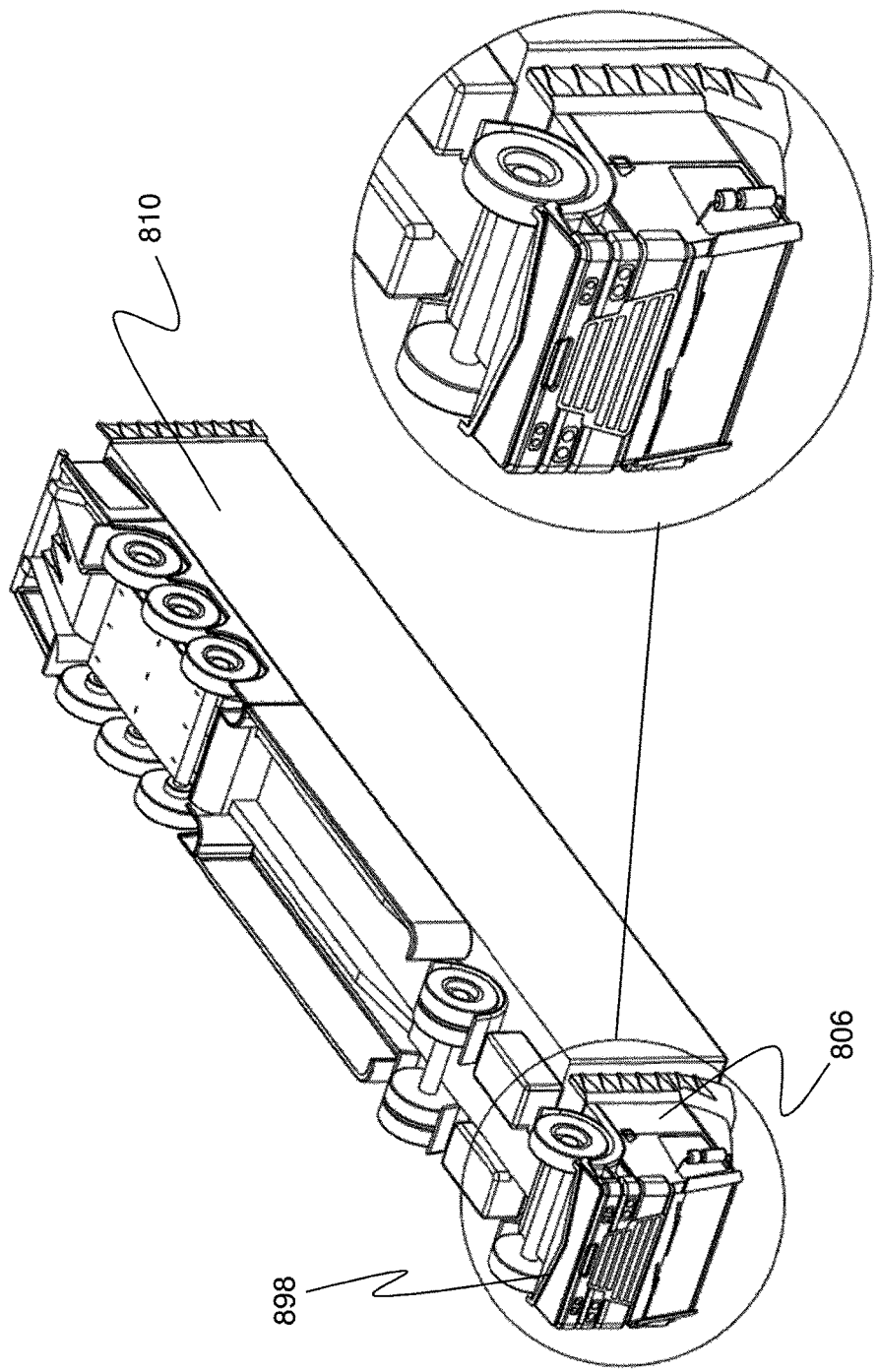
FIG. 29 shows a perspective view from the front of the vehicle of FIG. 16 in an inverted position.
Figure 30:
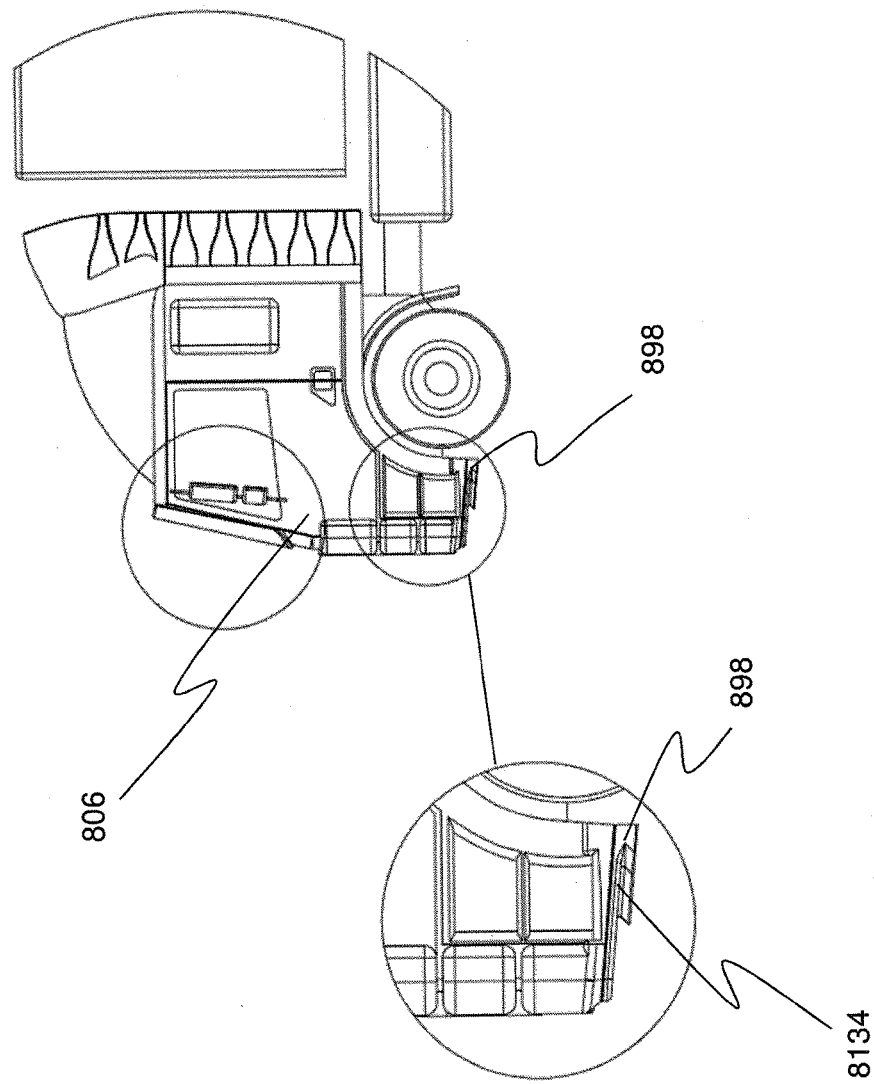
FIG. 30 shows a side view of the front end of the vehicle of FIG. 16 including a detailed side view of the air dam.

Referring now to FIGS. 28 to 30, the air dam 898 will be described in more detail. The air dam 898 is positioned on the underside of the cab 806 and is spaced by an offset distance d from the front of the cab 806. The air dam is V-shaped in the forward-rearward direction such that the air dam has a first arm 8128 angled towards a left hand side and the rear of the vehicle and a second arm 8130 angled towards a right hand side and the rear of the vehicle. Each arm has an end portion 8132 that extends from each of the first and second arms in a rearward direction.

The air dam 898 is offset from the front of the cab by a distance d of about 300 to 500 mm. The air dam protrudes from an underside of the vehicle by a distance of about 100 mm. However, as will be appreciated by the person skilled in the art any suitable dimensions may be selected for the offset and/or protrusion.

A V-shaped channel 8134 is provided in the air dam 898 and extends along a front face of the air dam.

Offsetting the air dam 898 from the front of the cab 806 has been found to improve the performance of the air dam, which results in improved aerodynamic efficiency of the road vehicle 804. A further advantageous consequence is that the air dam can be made to extend by a lesser distance from the underside of the cab with reduced impact on aerodynamic efficiency compared to air dams of the prior art. The reduced protrusion from the underside of the vehicle and the offset of the air dam from the front of the cab reduces the risk of the air dam impacting an obstacle such as a curb which could damage the air dam.

The V-shape of the dam in the forward-rearward direction is advantageous because it has been found to better direct air flow than a more conventional air dam (e.g. an air dam that is rounded in a forward-rearward direction).

It is believed that the improvements set forth herein will contribute to reduce turbulence, lower drag and thus reduce fuel consumption. Although described with reference to examples of articulated vehicles, the concepts herein are also applicable to 'rigid' vehicles.

Although the invention has been described above with reference to one or more preferred embodiments, it will be appreciated that various changes or modifications may be made without departing from the scope of the invention as defined in the appended claims.

The invention claimed is:

1. A road haulage trailer comprising: a roof, a front end, a rear end, and two side faces extending between the front and rear ends;
   wherein the trailer is provided with tail deflectors for directing air flow to a region behind the trailer during forward movement of the trailer;
   wherein a first of said tail deflectors protrudes from one of said side faces, and a second of said tail deflectors protrudes from the other of said side faces;
   further wherein each tail deflector extends rearwardly beyond the rear end of the trailer, and includes an air guide surface on an outer surface of each tail deflector extending from a respective side wall of the trailer and having a rear portion angled or curved towards a region behind the rear end of the trailer;
   wherein a forward-most leading portion of the outer surface of each tail deflector defines a convex curved surface extending from the respective side face of the trailer, wherein a convex curve of the convex curved surface extends from a forward-most leading edge of the outer surface of each tail deflector;
   wherein the convex curve has a radius of curvature that increases from a minimum at the forward-most leading edge of the outer surface of each tail deflector to a maximum at a rearward-most end of the outer surface of each tail deflector;
   a plurality of vortex generators provided on each tail deflector, wherein each of the plurality of vortex generators defines an air flow path starting proximate the maximum radius of curvature of the convex curve and extending towards the rearward-most end of each tail deflector.

2. The road haulage trailer according to claim 1, wherein the forward most leading edge of each tail deflector defines a continuation of the respective side face of the trailer, such that there is no spacing between the side faces of the trailer and a leading edge of each tail deflector.

3. The road haulage trailer according to claim 2, wherein the trailer defines a longitudinal axis extending in a direction between said front and rear ends and parallel with said side faces, and wherein the forward-most leading edge of each tail deflector protrudes outwardly from a respective side face of the trailer in a lateral direction away from said longitudinal axis.

4. The road haulage trailer according to claim 3, wherein the rear portion of each guide surface is configured for directing air inwardly of a plane coaxial with a respective side face of the trailer.

5. The road haulage trailer according to claim 1, wherein each tail deflector protrudes in a lateral direction away from respective side wall by a distance greater than or equal to 50 mm.

6. The road haulage trailer according to claim 1, wherein each vortex generator defines a wishbone shaped duct recessed in the outer surface of each tail deflector.

7. The road haulage trailer according to claim 6, wherein each duct has a base that slopes in a direction towards the rear end of the container.

8. The road haulage trailer according to claim 1, wherein each deflector is mounted via a mechanism configured to allow the deflector to fold on to the rear end of the trailer, or configured to allow the deflector to fold on to the respective side face of the trailer.

9. The road haulage trailer according to claim 1, wherein the orientation of each guide surface is adjustable dependent upon the road speed of the trailer.

10. The road haulage trailer according to claim 1, wherein the outer surface of each tail deflector is a planar surface in a region immediately behind the convex curved surface.

11. The road haulage trailer according to claim 10, wherein the planar surface extends from the region immediately behind the convex curved surface to the rearward-most end of the tail deflector.

12. The road haulage trailer according to claim 1, wherein each tail deflector extends rearwardly beyond the rear end of the trailer by approximately 500 mm.

13. A road haulage trailer comprising:
    a roof, a front end, a rear end, and two side faces extending between the front and rear ends; and
    tail deflectors for directing air flow to a region behind the trailer during forward movement of the trailer,
    wherein a first of said tail deflectors protrudes from one of said side faces, and a second of said tail deflectors protrudes from the other of said side faces,
    wherein each tail deflector extends rearwardly beyond the rear end of the trailer, and includes an air guide surface on an outer surface of each tail deflector extending from a respective side wall of the trailer,
    wherein a forward-most leading portion of the outer surface of each tail deflector is curved,
    a planar rear portion extends immediately behind said curved leading portion, wherein the planar portion is angled towards a region behind the rear end of the trailer, and
    wherein a plurality of vortex generators are provided on the planar portion of each tail deflector, wherein each vortex generator extends over a full length of the planar rear portion in a forward-rearward direction, and wherein each of the plurality of vortex generators have a neck on the planar portion proximate said curved leading portion and a wider region extending towards the region behind the rear end of the trailer.

14. The road haulage trailer according to claim 13, wherein a rear end of the vortex generators terminate at a rear edge of the tail deflectors.

15. The road haulage trailer according to claim 13, wherein each vortex generator defines a wishbone shaped duct recessed in the outer surface of each tail deflector.

16. A road haulage trailer comprising:
a roof, a front end, a rear end, and two side faces extending between the front and rear ends; and
tail deflectors for directing air flow to a region behind the trailer during forward movement of the trailer,
wherein a first of said tail deflectors protrudes from one of said side faces, and a second of said tail deflectors protrudes from the other of said side faces,
further wherein each tail deflector extends rearwardly beyond the rear end of the trailer, and includes an air guide surface on an outer surface of each tail deflector extending from a respective side wall of the trailer,
wherein a forward-most leading portion of the outer surface of each tail deflector is curved,
a rear portion extends immediately behind said curved leading portion that is angled or curved towards a region behind the rear end of the trailer, and
wherein a plurality of vortex generators are provided on each tail deflector, wherein each vortex generator extends in a forward-rearward direction over three quarters of a length of the rear portion, and wherein each of the plurality of vortex generators are recessed such that walls of the vortex generators start proximate said curved leading portion and sloped towards the region behind the rear end of the trailer.

17. The road haulage trailer according to claim 16, wherein each vortex generator defines a wishbone shaped duct recessed in the outer surface of each tail deflector.

* * * * *